United States Patent
Strong et al.

(10) Patent No.: US 10,104,608 B2
(45) Date of Patent: Oct. 16, 2018

(54) SYSTEMS AND METHODS FOR ENHANCED MESH NETWORKING

(71) Applicant: eero inc., San Francisco, CA (US)

(72) Inventors: Jasmine Strong, San Francisco, CA (US); Mete Rodoper, San Francisco, CA (US); Ryan Thompson, San Francisco, CA (US)

(73) Assignee: eero inc., San Francsico, CA (US)

( * ) Notice: Subject to any disclaimer, the term of this patent is extended or adjusted under 35 U.S.C. 154(b) by 0 days.

(21) Appl. No.: 15/806,171

(22) Filed: Nov. 7, 2017

(65) Prior Publication Data

US 2018/0132159 A1 May 10, 2018

Related U.S. Application Data

(60) Provisional application No. 62/418,520, filed on Nov. 7, 2016.

(51) Int. Cl.
| | |
|---|---|
| *H04W 40/02* | (2009.01) |
| *H04W 48/20* | (2009.01) |
| *H04L 12/701* | (2013.01) |
| *H04W 24/02* | (2009.01) |
| *H04W 84/18* | (2009.01) |

(52) U.S. Cl.
CPC ............ *H04W 48/20* (2013.01); *H04L 45/00* (2013.01); *H04W 24/02* (2013.01); *H04W 40/02* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,660,318 B2 | 2/2010 | Rahman et al. | |
| 2007/0099634 A1* | 5/2007 | Chari | H04L 67/2804 455/456.3 |
| 2007/0253403 A1* | 11/2007 | Kodialam | H04L 45/00 370/351 |
| 2008/0107069 A1* | 5/2008 | Wu | H04W 40/14 370/329 |
| 2010/0177670 A1* | 7/2010 | Hottinen | H04L 5/003 370/294 |
| 2010/0189063 A1* | 7/2010 | Kokku | H04L 47/10 370/329 |
| 2012/0079159 A1* | 3/2012 | Rajwar | G06F 1/3206 710/309 |
| 2013/0021941 A1* | 1/2013 | Zheng | H04W 28/16 370/252 |
| 2013/0091214 A1* | 4/2013 | Kellerman | G06Q 10/00 709/204 |
| 2013/0159221 A1* | 6/2013 | Thompson | G06F 11/0709 706/12 |

(Continued)

*Primary Examiner* — Hicham B Foud
*Assistant Examiner* — Gautam Sharma
(74) *Attorney, Agent, or Firm* — Jeffrey Schox; Diana Lin

(57) ABSTRACT

A method for enhanced mesh networking, preferably including performing network analysis, configuring router link parameters, and managing routing paths. A metric for routing path assessment, preferably including a throughput metric and a channel utilization metric. A Segment Table Announced Mesh Protocol, preferably including determining network segments and designating forwarding devices for communication between the network segments.

19 Claims, 11 Drawing Sheets

(56) References Cited

U.S. PATENT DOCUMENTS

| | | |
|---|---|---|
| 2016/0073330 A1 | 3/2016 | Patil et al. |
| 2016/0269277 A1 | 9/2016 | Floberg et al. |
| 2017/0250856 A1 | 8/2017 | Jetcheva et al. |

* cited by examiner

SYSTEMS AND METHODS FOR ENHANCED MESH NETWORKING

CROSS-REFERENCE TO RELATED APPLICATIONS

This application claims the benefit of U.S. Provisional Application Ser. No. 62/418,520, filed on 7 Nov. 2016, which is incorporated in its entirety by this reference.

TECHNICAL FIELD

This invention relates generally to the computer networking field, and more specifically to new and useful systems and methods for enhanced mesh networking.

BACKGROUND

The modern internet has revolutionized communications by enabling computing devices to transmit large amounts of data quickly over incredibly vast distances. The rate of innovation set by application and web developers is breathtakingly fast, but unfortunately, not all aspects of the internet experience have kept pace. In particular, even as people rely more and more heavily on home networking solutions to enable internet connectivity for a rapidly increasing collection of electronic devices, the technology underpinning those solutions often provides a woefully inadequate user experience. In particular, many users find that a single wireless access point is not able to provide wireless coverage for an entire home or small business. While technology exists to extend the wireless network, it is often both difficult to configure and inefficient in performance. Thus, there is a need in the computer networking field to create new and useful systems and methods for enhanced mesh networking.

DESCRIPTION OF THE INVENTION EMBODIMENTS

The following description of the invention embodiments of the invention is not intended to limit the invention to these invention embodiments, but rather to enable any person skilled in the art to make and use this invention.

1. System for Enhanced Mesh Networking

Figure 1:
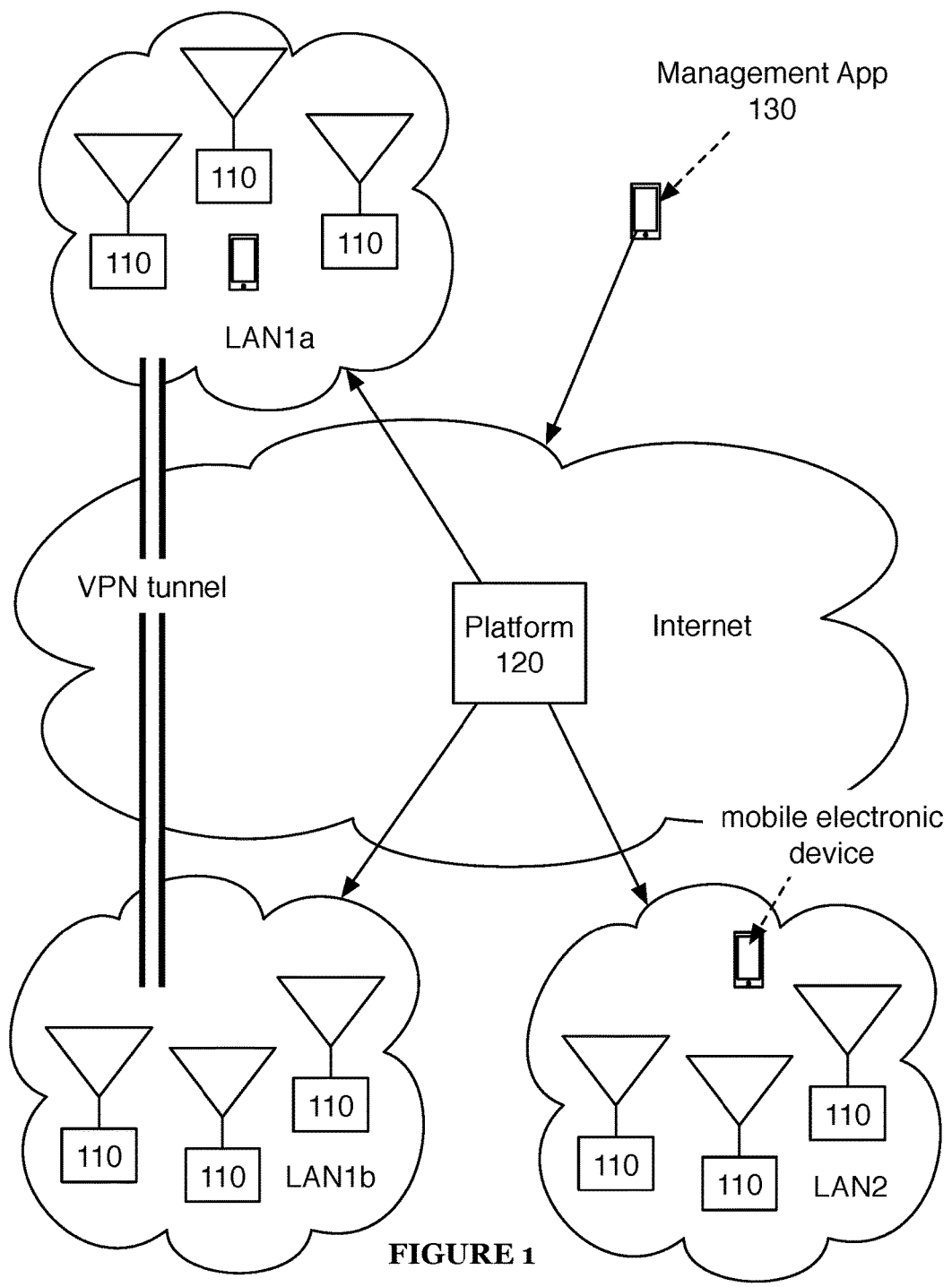
FIG. 1 is a diagram representation of a system of an invention embodiment.

A system 100 for enhanced mesh networking includes a plurality of mesh network capable routers 110, as shown in FIG. 1. The system 100 may additionally or alternatively include a router management platform 120 and/or a management application 130.

Figure 2:
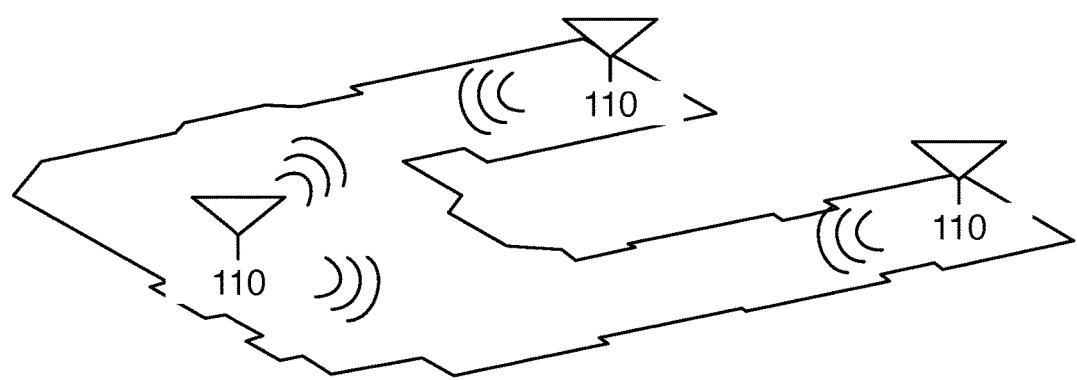
FIG. 2 is a diagram representation of a system of an invention embodiment.

The system 100 functions to enable seamless wireless coverage of an area (e.g., a user's home) using mesh networking while reducing the complexity of configuring such a network. Typically, to configure an internet-connected wireless mesh network, a user must configure a first router to serve as a gateway to the internet (e.g., by connecting the router to a cable modem). Further, some networking device (generally the aforementioned first router) must also be configured to serve as a network address translation (NAT) server, a dynamic host configuration protocol (DHCP) server, and a wireless access point. Then, to extend wireless coverage as shown in FIG. 2, additional devices (e.g., wireless routers, access points, repeaters) must be added. Even in the simple case of two or three wireless access points, the configuration options are virtually endless. For example, the access points could exist on a single bridged network, or could be separated into different networks (e.g., could be assigned to different VLANs; that is, virtual local area networks). The access points could be connected to each other by Ethernet cables, or simply serve as wireless repeaters. The access points could share available Wi-Fi channel space in any number of ways.

Even for experienced users, the array of network configurations available can be extremely overwhelming. The system 100 preferably performs much of this configuration both automatically and dynamically-optimizing the network for a user's needs without requiring extensive computer networking knowledge or hassle.

The mesh-network capable routers 110 are preferably multi-band (e.g., dual-band, tri-band, etc.) routers substantially similar to those described in U.S. patent application Ser. No. 15/008,251, the entirety of which is incorporated by this reference. Additionally or alternatively, the routers 110 may be any suitable networking devices (e.g., smart access points).

Figure 3:
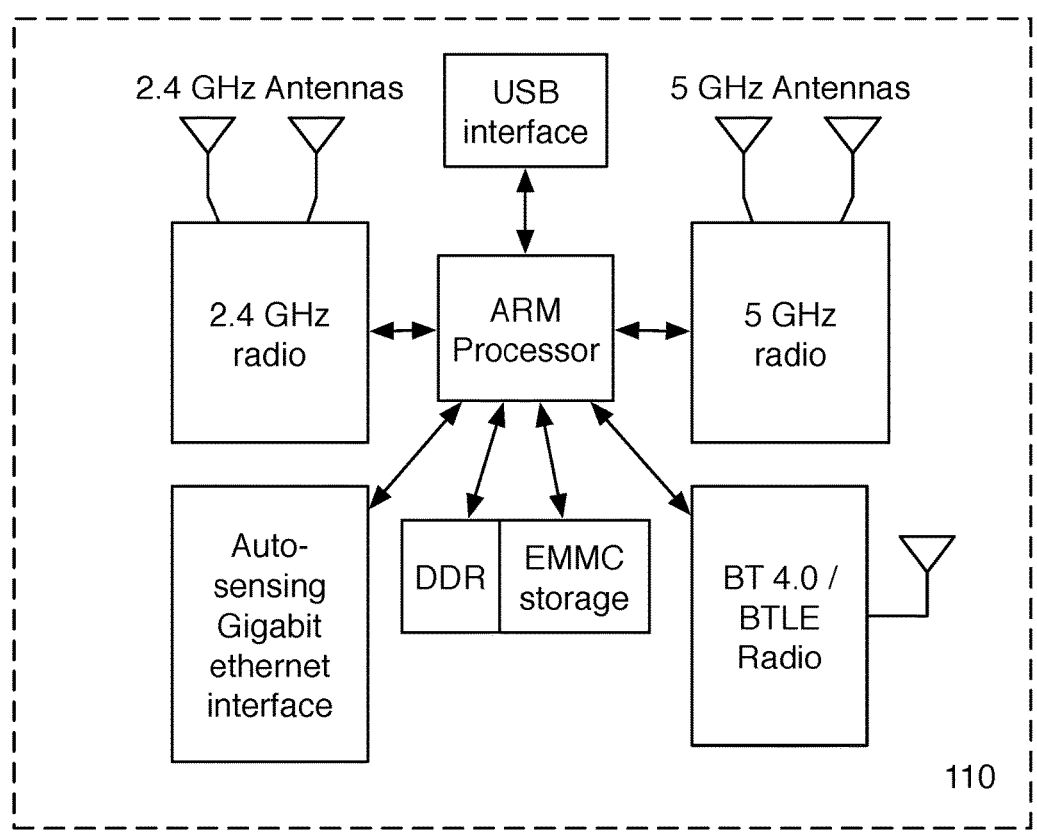
FIG. 3 is a schematic representation of a smart router of a system of an invention embodiment.

The routers 110 preferably include a Wi-Fi radio and a processor. The routers 110 can additionally or alternatively include a Bluetooth radio, an Ethernet interface, and/or any other suitable hardware or software. In one example implementation, as shown in FIG. 3, a smart router includes two Wi-Fi radios: one 5 GHz radio and one 2.4 GHz radio, a Bluetooth radio capable of Bluetooth Smart communication, an auto-sensing gigabit Ethernet interface, an ARM processor, DDR RAM, EMMC storage (for router firmware), and a USB interface (e.g., for adding network-accessible storage). In a second example implementation, a smart router includes three Wi-Fi radios: two 5 GHz radios and one 2.4 GHz radio, a Bluetooth radio capable of Bluetooth Smart communication, an 802.15.4 radio (e.g., configured to communicate using one or more 802.15.4 protocols, such as Thread, ZigBee, etc.), an auto-sensing gigabit Ethernet interface, an ARM processor, DDR RAM, and EMMC storage (for router firmware). In a third example implementation, a smart router includes two Wi-Fi radios: one 5 GHz radio and one 2.4 GHz radio, a Bluetooth radio capable of Bluetooth Smart communication, an 802.15.4 radio (e.g., configured to communicate using one or more 802.15.4 protocols, such as Thread, ZigBee, etc.), an ARM processor, DDR RAM, and EMMC storage (for router firmware).

Alternatively, the smart routers can be any suitable router, wireless access point, and/or other networking device. However, the smart routers can include any suitable combination of any suitable radios (e.g., short-range radios such as NFC, RF, etc.), processing systems, sensor set, or other components.

The Wi-Fi radio(s) preferably function to provide wireless access to the router 110. The Wi-Fi radio preferably serves to allow electronic devices (e.g., smartphones, laptops, gaming consoles) to communicate wirelessly with the router 110 and with each other through a LAN, as well as to allow routers 110 to communicate with each other over a mesh.

Each Wi-Fi radio preferably includes at least one antenna; additionally or alternatively, the Wi-Fi radio may include an interface to connect to an external antenna. Antennas may be of a variety of antenna types; for example, patch antennas (including rectangular and planar inverted F), reflector antennas, wire antennas (including dipole antennas), bow-tie antennas, aperture antennas, loop-inductor antennas, ceramic chip antennas, antenna arrays, and fractal antennas. The Wi-Fi radio preferably supports communication over all of IEEE 802.11 a/b/g/n/ac standards (as well as the modified 802.11 s standard discussed later), but may additionally or alternatively support communication according to any standard (or no standard at all).

The router 110 may include any number of Wi-Fi radios operating on any suitable frequency ranges. In one implementation, the router includes two or more Wi-Fi radios: one or more operable on the 2.4 GHz band and another one or more operable on one or more 5 GHz bands (e.g., 5.2 GHz band, 5.8 GHz band, 5 GHz bands requiring use of DFS, etc.). The router 110 may additionally include a switchable radio, enabling the router 110 to select from two different communication modes (2.4 GHz+5 GHz or 5 GHz+5 GHz) in order to maximize connection quality.

The Wi-Fi radios preferably operate using single-input/single-output (SISO) communication techniques, but may additionally or alternatively operate using multiple-input and/or multiple-output communication techniques (e.g., SIMO, MISO, MIMO). If the Wi-Fi radios operate using MIMO techniques, the Wi-Fi radios may use any type of MIMO techniques (e.g., precoding, spatial multiplexing, space-division multiple access, and/or diversity coding). Further, the Wi-Fi radios may perform MIMO communication either independently (e.g., a radio performs MIMO communication with multiple antennas coupled to that radio) or cooperatively (e.g., two separate radios perform MIMO communication together).

The Bluetooth radio functions to allow devices to communicate with the router 110 over a connection mechanism alternative to Wi-Fi. The Bluetooth radio is preferably used to allow the router 110 to be configured for the first time by a smartphone (or other Bluetooth-enabled computing device). The Bluetooth radio may additionally or alternatively be used for any other purpose; for example, for configuring the router 110 at a different time, for communication between routers 110, or for communication with smart devices in a home (e.g., smart locks, light bulbs). The Bluetooth radio preferably supports the Bluetooth 4.0 standard, including communications capabilities for classic Bluetooth as well as Bluetooth Low-Energy (BTLE). The Bluetooth radio preferably switches between classic Bluetooth and Bluetooth Low-Energy, but may additionally or alternatively be capable of communicating over both simultaneously.

The Bluetooth radio preferably includes at least one antenna; additionally or alternatively, the Bluetooth radio may include an interface to connect to an external antenna. Antennas may be of a variety of antenna types; for example, patch antennas (including rectangular and planar inverted F), reflector antennas, wire antennas (including dipole antennas), bow-tie antennas, aperture antennas, loop-inductor antennas, ceramic chip antennas, antenna arrays, and fractal antennas.

The Ethernet interface functions to provide wired connectivity to the router 110. The Ethernet interface preferably allows wired devices (including other routers 110) to connect to the router 110. The Ethernet interface preferably includes a plurality of Ethernet ports. Ports of the Ethernet interface are preferably capable of 1000BASE-T (i.e., gigabit) communication, but may additionally or alternatively be capable of communication at any rate. The Ethernet interface preferably automatically sets the communication rate based on the capabilities of connected devices, but may additionally or alternatively set the communication rate manually. In addition to the Ethernet interface, the router 110 may additionally or alternatively perform wired communication over any wired interface. For example, the router 110 may perform communication through a powerline interface (e.g., Ethernet over Power).

The router 110 preferably includes a microprocessor and may additionally or alternatively include any other hardware. For example, the router 110 may include a USB interface (for connection of network-attached storage, a DLNA server, etc. or for configuration purposes). In one embodiment, the router 110 includes a hardware encryption module (HEM). The HEM is preferably a chip that stores an encryption key securely (e.g., the Atmel SHA204) and performs data encryption based on that key, but may additionally or alternatively be any hardware module capable of encrypting transmissions from and/or decrypting transmissions to the router 110.

The router 110 preferably stores firmware and/or software on an embedded MultiMediaCard (eMMC), but may additionally or alternatively store firmware and/or software in any suitable storage solution.

The router 110 preferably operates as a Linux server running Python programs, but may additionally or alternatively operate using any software and/or firmware.

The router 110 is preferably configured using the management application 130 operating on a remote electronic device (e.g., a user's smartphone), but may additionally or alternatively be configured by any suitable manner (e.g., by a web interface).

The routers 110 preferably communicate with each other using one or more versions of the 802.11s protocol (e.g., the modified version described below), using Simultaneous Authentication of Equals (SAE)-based encryption and hybrid wireless mesh protocol (HWMP) path selection, but may additionally or alternatively communicate with each other in any manner.

A person of ordinary skill in the art will recognize that although all or some of the routers 110 may perform routing functions (and/or be capable of performing routing functions), the routers 110 can additionally or alternatively include access points (e.g., wireless access points such as wireless mesh access points, etc.), repeaters, mesh nodes, switches, and/or any other suitable network devices.

The routers 110 are preferably configured and/or managed by the router management platform 120 (or any suitable remote management platform). In one example, routers 110 may be configured by altering stored configuration profiles in a remote server (part of the router management platform 120), after which the stored configuration profiles are pushed to the routers 110. This technique is particularly useful in mesh networking applications; if the router management platform 120 is aware that three smart routers are intended for use in a single network, the router management platform 120 can attempt to bridge the networks of the three routers regardless of physical location or existing network topology.

The router management platform 120 may additionally function to manage connections and/or permissions associated with various networks. For example, a user of the router management platform 120 associated with one network may have guest permissions on another network (e.g., users of LAN1 may be granted permissions with respect to LAN2 via the platform). As another example, the router management platform 120 may be used for (or may otherwise facilitate) bridging two networks via a VPN tunnel (e.g., two physical networks LAN1a and LAN1b into a single logical network), as shown in FIG. 1.

The router management platform 120 may additionally or alternatively be used to collect connection data from the routers 110 and/or provide this data (or analysis of this data) to users either via the routers 110 or otherwise (e.g., via a web portal).

The system 100 may additionally include a management application 130 that functions to manage routers 110 that are part of a network. The management application 130 is preferably a native application running on a smartphone (e.g., an iOS or Android application), but may additionally or alternatively be any suitable application (e.g., a web app, a desktop app, etc.). The management application 130 may be used to perform or aid in router 110 configuration, but may also be used to collect data used by the method 200. For example, a management application operable on a device for which location data is desired may collect (and potentially analyzed and/or transmit) data that may be used to perform device localization.

Figure 4:
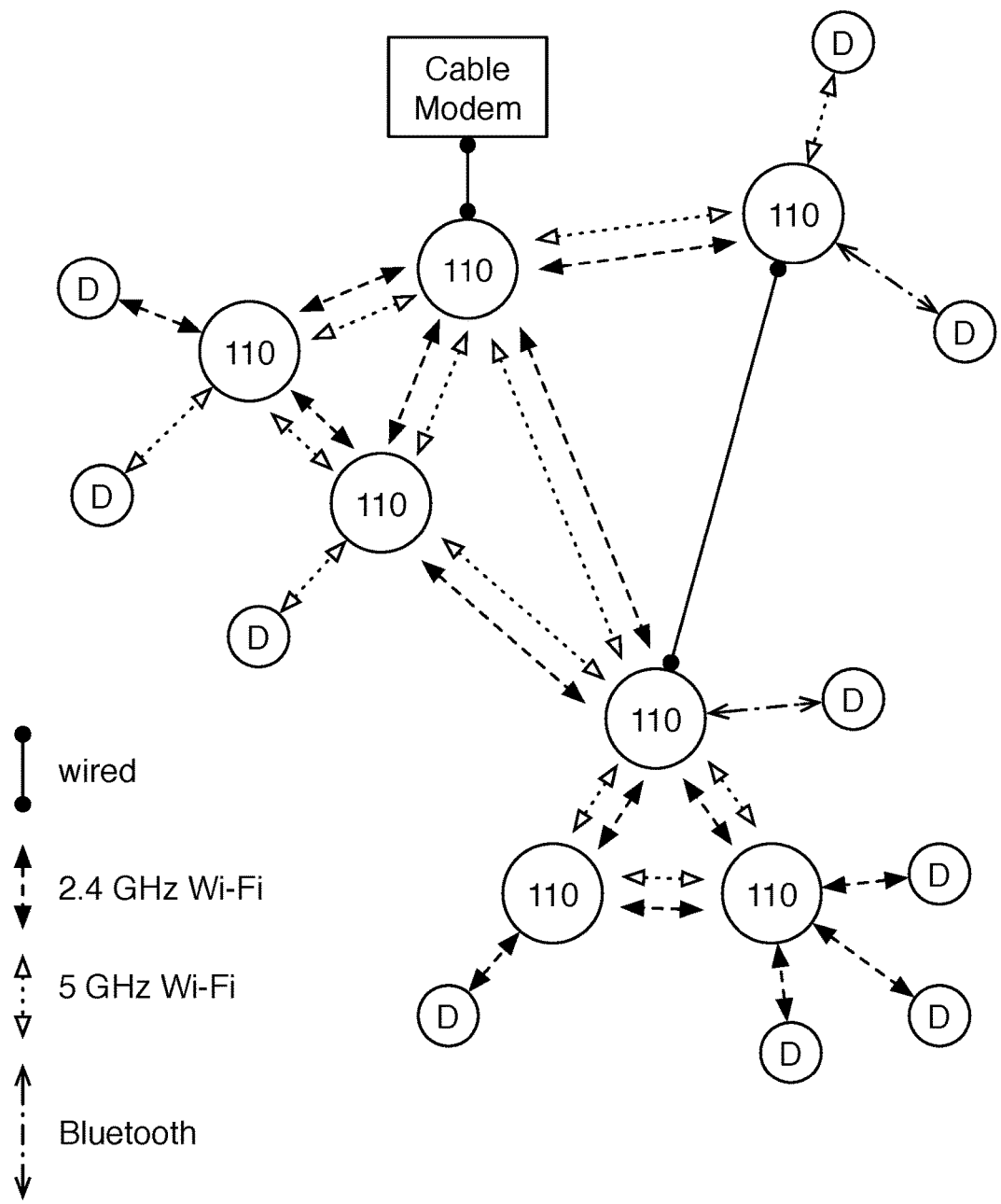
FIG. 4 is a network chart representation of an example system of an invention embodiment.

Routers 110 of the same LAN are preferably coupled together as a mesh network; e.g., the example network as shown in FIG. 4. Routers 110 may communicate to each other and/or to client devices (represented by the circle 'D' symbol) in any manner, e.g., 2.4 GHz Wi-Fi, 5 GHz Wi-Fi, Bluetooth, wired Ethernet.

Information traveling on such a mesh network often may take many paths. The system 100 preferably attempts to path information along the mesh in such a way as to enhance performance compared to traditional mesh networking architectures.

The system 100 preferably attempts to enhance mesh networking performance by intelligently managing communication between network nodes (e.g., smart routers 110) and between devices communicating with those nodes (e.g., laptops, smartphones, TVs, etc.). Such management includes managing the characteristics of links from router to router and from router to device (e.g., channel, radio, broadcast time, etc.) as well as actively routing information across those links (e.g., attempting to identify optimal paths across the network for packets).

A router 110 preferably attempts to make every link possible for the router 110 within the network. For example, a router 110 that sees four other routers 110 within its wireless range (on both 2.4 GHz and 5 GHz) may create eight links (one for each radio within range). The router 110 preferably adopts this approach because the cost for maintaining a link is relatively low compared to the cost of communicating on a link. Alternatively, the router 110 may not attempt to make every possible link. For example, if a router 110 has an Ethernet connection to another router 110, those two routers 110 may not link wirelessly to each other. As another example, in high density meshes, a router 110 may choose to connect only to a threshold number of routers 110 nearby (e.g., 15 routers of 30 total routers within range).

The channels used by the radios of the routers 110 are preferably set to reduce interference across the network. For example, two routers 110 near each other may use the same 5 GHz band (allowing those two routers to communicate with each other AND with devices, but potentially causing collisions for communication from client devices near both routers 110), but a different 2.4 GHz band (allowing client devices near both routers 110 to communicate to one router 110 without interfering with communication of other client devices to the other router 110). Router 110 channels may be orthogonal or overlapping. For example, routers 110 near each other may choose different, but overlapping, 2.4 GHz bands, allowing those routers to still communicate with each other while also reducing client device interference.

Router channels may be set in any manner. In one example implementation, a first router 110 selects a 2.4 GHz channel (referred to as 2.4 A) and a 5 GHz channel (5 A) based on a radio survey. Each additional router 110 then selects the same 5 GHz channel (5 A) but selects the 2.4 GHz channel based on a radio survey (e.g., trying to minimize 2.4 GHz interference between routers 110). Router channels may be set individually by routers 110, in concert by a set of routers 110, by the management platform 120, or by any other agent.

Router channels may also be modified at any time. For example, a router 110 having selected a channel by the technique described in the preceding paragraph may switch its 5 GHz channel in response to heavy traffic on that channel by client devices. Note that in this case, the router 110 may additionally need to change its 2.4 GHz channel as well (as the router 110 may have to communicate with other nodes on the 2.4 GHz band now instead of the 5 GHz band, such as if the other nodes are not operating on its new 5 GHz channel).

Routers 110 may additionally or alternatively attempt to modify any other parameters related to inter-router links. For example, routers 110 may adjust antenna patterns and/or gain to reduce network interference. Additionally or alternatively, routers 110 may perform beam-forming or beam-steering (potentially with dynamic gain) for the same purpose. Similar to channels, other router parameters may be set individually by routers 110, in concert by a set of routers 110, by the management platform 120, or by any other agent.

When a device connected to a router 110 attempts to communicate with another device on the network (or via a gateway of the network), the router 110 preferably determines an optimal path for the communication to follow. Routers 110 preferably utilize IEEE 802.11s Hybrid Wireless Mesh Protocol (HWMP) and/or a modified version thereof (e.g., such as described below), but may additionally or alternatively use any technique for determining pathing.

The following is a description of an example implementation of the pathing technique of the system 100: when a router 110 wants to send a packet to a destination, the router 110 first checks its routing table to see if it has a current path to the destination. If so, the router 110 forwards the packet to the next hop node. If not, the router initiates a path discovery process by creating a path request (PREQ) packet. This packet contains the source MAC Address, the HWMP sequence number of the originator, a path discovery ID, time-to-live (TTL) and Life Time fields, hop count, the destination MAC address, and a link metric. As in 802.11s, this PREQ packet is forwarded across a network until the destination is reached. Based on the PREQ packets received, the destination router(s) 110 send back a path reply (PREP) packet, similar to the PREQ packet. Of note, the link metric and hop count are updated as the packet moves along the network (essentially taking the path integral of those values). One or both of the link metric and hop count are used to determine, at the source router 110, the quality of the paths available.

Default 802.11s implementations utilize a metric referred to as an "airtime link metric", defined as the total data transmission time (in time units) divided by one minus the frame error rate:

$$\frac{T}{1-E}.$$

While the system 100 may use this metric (or any metric), the system 100 preferably uses a novel metric (herein referred to as a Bifrost metric). In contrast to the airtime link metric of 802.11s, the Bifrost metric preferably accounts for (e.g., takes as input) factors such as data throughput (e.g., channel transmission rate) and/or channel utilization. The Bifrost metric can additionally or alternatively include any other suitable factors (e.g., thermal throttling and/or enforced dead transmit time, such as described below).

In one embodiment, the Bifrost metric is determined based on one or more throughput metrics and/or channel utilization metrics (e.g., associated with wireless channels). The Bifrost metric (and/or underlying metrics associated with the Bifrost metric, such as throughput and/or channel utilization metrics) are preferably associated with (e.g., determined based on characteristics of) the links of the network (e.g., wireless links; wired links; aggregated groups of links, such as links sharing common endpoints; etc.), such as being determined independently for each link of a path within the network. However, the metrics can additionally or alternatively be associated with nodes, paths, physical regions, and/or any other suitable elements associated with the network. The metrics can be direction-specific (e.g., for link or path metrics, determined independently for each direction along the link or path) or direction-nonspecific (e.g., identical for a forward and reverse path, identical for a link from a first to a second device and a link from the second to the first device, etc.).

The throughput metrics can include transmission and/or reception rates (e.g., data rates, frame rates, packet rates, etc.), and/or any other suitable throughputs. The throughput metrics are preferably metrics associated with (e.g., measured at) the physical layer, but can additionally or alternatively be associated with the data link layer, network layer, transport layer, and/or any other suitable layer (e.g., of the OSI layer model). The throughput metrics are preferably determined based on a filtered and/or otherwise processed version of the collected throughput data (e.g., low-pass filtering, Kalman filtering, Hamming windowing, etc.). For example, the throughput metric can represent an average (and/or other statistical function, such as median) over time, such as a moving average (e.g., exponentially weighted moving average, triangle-number weighted moving average, Hull moving average, unweighted moving average, etc.). However, the metrics can additionally or alternatively be substantially instantaneous metrics (e.g., associated with the most recently collected data), can represent maximum values (e.g., maximum attained in a particular time window), and/or can be processed in any other suitable manner. The throughput measurements can be sampled only during times when data transmission is being attempted (e.g., while data is queued for transmission, during transmission, etc.) or at all times (e.g., whether or not nodes are attempting to transmit data), and/or can be sampled at any other suitable times. In specific examples, a throughput metric is equal to $Tx_{avg}$, the exponentially weighted moving average of the transmit throughput (e.g., from a node along a link) measured at the physical layer (TX PHY rate); $Rx_{avg}$, the exponentially weighted moving average of the receive throughput (e.g., to the node along the reverse direction of the link) measured at the physical layer (RX PHY rate); and/or a combination thereof (e.g., sum, inverse sum, arithmetic and/or geometric mean, minimum or maximum of the two, etc.).

The channel utilization metrics are preferably adjusted to represent channel utilization not attributable to the entity (e.g., node, link, path, etc.) for which the metric is calculated. One formula for such an adjusted channel utilization metric is given as:

$$U = \frac{T_{busy} - T_{self}}{T_{active}}$$

wherein $T_{active}$ is an active time during which the node is active on a wireless channel (e.g., time during which at least one radio of the node is tuned to the channel) associated with the wireless link; $T_{busy}$ is a total utilization time, within the active time, during which the wireless channel is in use; and $T_{self}$ is a self-utilization time, within the active time, during which the node is transmitting on the wireless channel. Alternatively, can represent time during which the node is transmitting along a particular wireless link (e.g., the wireless link for which the metric is being calculated) and/or to a particular endpoint, rather than all time spent by the node transmitting for any purpose; time during which the channel is used for transmissions to the node (instead of or in addition to time spent for transmissions from the node); and/or any other suitable self-utilization time associated with the node, wireless link, and/or other entity. However, the channel utilization metrics can additionally or alternatively include any other suitable adjustments (e.g., in place of or in addition to the $T_{self}$ term), and/or can be unadjusted (e.g., can exclude the $T_{self}$ term).

In one implementation of this embodiment, the Bifrost metric is computed as follows: at each node, a base metric is computed as the inverse of a throughput metric D. The base metric is then modified by terms including a channel utilization metric U, preferably an adjusted channel utilization metric that represents the channel utilization not due to that node (e.g., amount of traffic on the channel not due to the node, fraction of time the channel is unavailable for the node to transmit on, etc.). Two formulas for such a metric M are given as:

$$M = \frac{C + U}{D}$$

and/or $$M = \frac{C}{D(1 - U)}$$

where C is some constant (e.g., kept fixed for all calculations of the metric M for all nodes and/or links, constant for a given node and/or link but varying between different nodes and/or links, etc.), $T_{busy}$ is time the channel was in use, $T_{self}$ is time the channel was in use due to communication from the node itself, and $T_{active}$ is the time the total radio spent on the channel. Specific examples of the metric can include:

$$M = \frac{C + \frac{T_{busy} - T_{self}}{T_{active}}}{Tx_{avg}};$$

$$M = \frac{C + \frac{T_{busy} - T_{self}}{T_{active}}}{Rx_{avg}};$$

$$M = \frac{C}{Tx_{avg}\left(1 - \frac{T_{busy} - T_{self}}{T_{active}}\right)};$$

and/or $$M = \frac{C}{Rx_{avg}\left(1 - \frac{T_{busy} - T_{self}}{T_{active}}\right)}$$

As can be seen, this metric decreases with increasing throughput (i.e., faster connections result in lower metric values) and increases along with channel traffic (i.e., less traffic results in lower metric values). This metric also exhibits reduced sensitivity (e.g., is invariant to, changes less than a metric using an unadjusted channel utilization metric, etc.) contributions of the node measuring the metric to traffic.

The Bifrost metric can optionally include one or more parameters representing hardware conditions, such as temporary performance restrictions. For example, the metric can include a radio throttling parameter, such as $T_{throttle}$, representing a throttling time within the active time during which radio transmission was prevented due to throttling, and/or $f_{throttle}$, representing the fractional amount of radio throttling (e.g., the fraction of time during which radio throttling occurred, wherein $$f_{throttle} = \frac{T_{throttle}}{T_{active}}\bigg).$$

Radio throttling can be used, for example, to prevent and/or alleviate radio overheating (e.g., by reducing radio transmission time, thereby reducing the thermal energy generated by the radio). In a first variation, the hardware condition parameters (e.g., throttling parameter) are included in the channel utilization metric, such as $$U = \frac{T_{busy} - T_{self} + T_{throttle}}{T_{active}} \text{ or } U = \frac{T_{busy} - (T_{self} f_{throttle})}{T_{active}}.$$

In a second variation, the hardware condition parameters are included in the overall Bifrost metric, such as $$M = \frac{C + U}{D f_{throttle}}, M = \frac{C + U/f_{throttle}}{D}, \text{ and/or } M = \frac{C}{D f_{throttle}(1 - U)}.$$

However, the Bifrost metric can include any other suitable hardware condition parameters in any other suitable manner.

After the Bifrost metric has been calculated for a given link (e.g., defining the link cost), it's added to the sum of previous metrics along the path, such that the eventual metric becomes a path integral for Bifrost metric values along the path (e.g., defining the path cost). As described above, the path with the smallest Bifrost metric value is the 'best' path. In one variation, nodes of a path (e.g., all nodes, all except an initial and/or terminal node, etc.) each calculate a link metric for a link associated with the node (e.g., originating from or terminating at the node), receive a partial path metric (e.g., the cumulative sum of link metrics along a portion of the path, such as from the initial or terminal node to the node transmitting the partial path metric) from a neighboring node (e.g., next or previous node along the path), add the calculated link metric to the partial path metric, and transmit the new partial path metric to the opposing neighbor (e.g., continuing along the path or the reverse path).

In one example, the terminal node of a path (node A) transmits (e.g., in response to receiving a path request) a path reply frame, preferably including a metric field (e.g., set to zero) to the previous node along the path (node B). In response to receiving the path reply frame, node B determines the Bifrost link metric associated with the link from itself to node A (B-A link), updates the partial path metric by adding the link metric to the value from the metric field, and transmits an updated path reply frame (e.g., including the updated partial path metric) to the previous node along the path (node C). Analogously, node C calculates the C-B link metric, updates the partial path metric, and transmits a path reply including the updated metric (representing the cost from C to A via B) to the previous node along the path. In this example, the path reply is propagated back to the initial node of the path. However, any node can optionally ignore or otherwise act upon receipt of a path reply (e.g., based on its metric). For example, if a first node receives two path replies for path segments from the first node to a second node, each via a different path (e.g., different series of intermediary nodes), it can optionally propagate the path reply with the better (e.g., lower) metric and ignore the path reply with the worse metric (e.g., as shown in FIG. 5C).

Figure 5A:
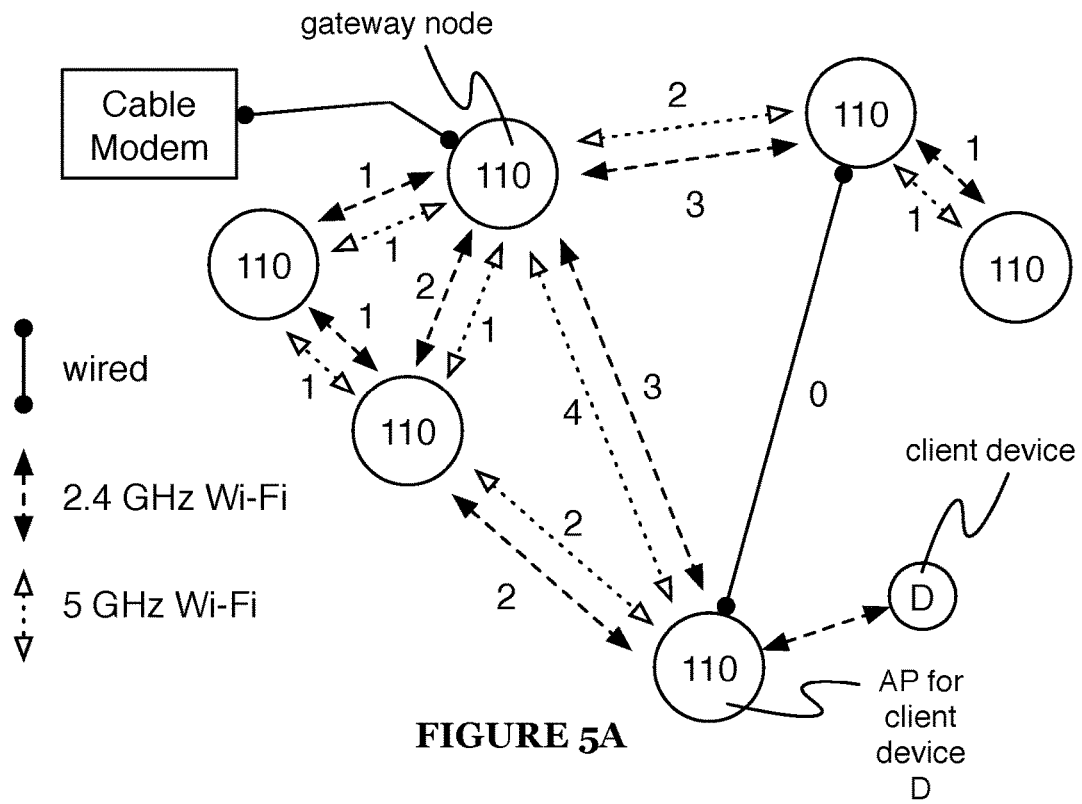
FIG. 5A is a network chart representation of the example system of the invention embodiment.
Figure 5B:
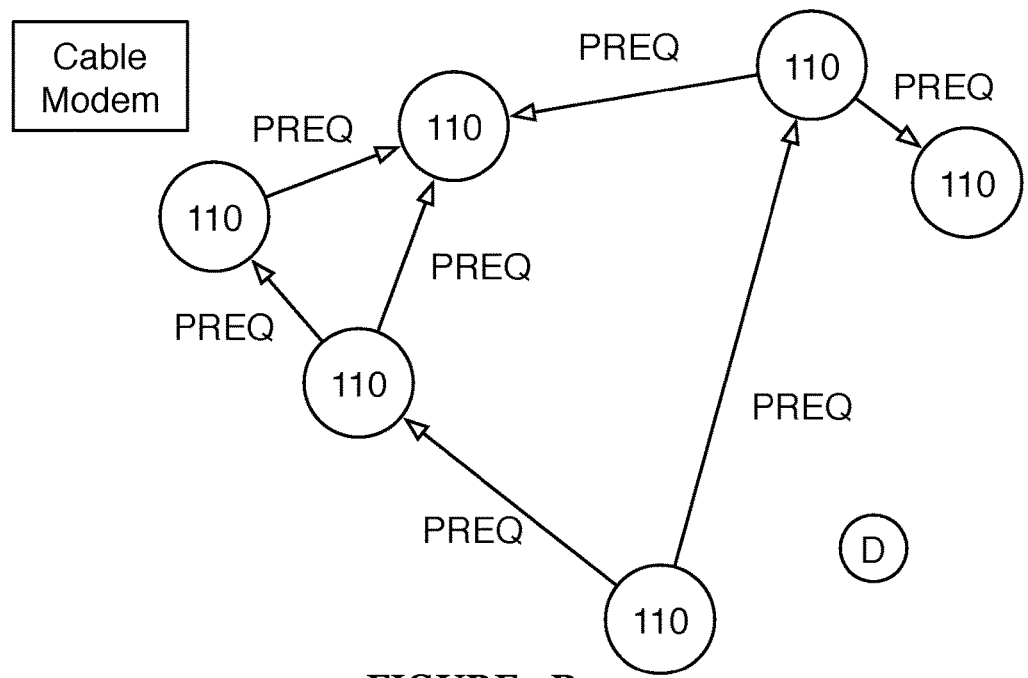
FIGS. 5B-5C are network chart representations of path requests and path replies, respectively, sent within the example system of the invention embodiment.
Figure 5C:
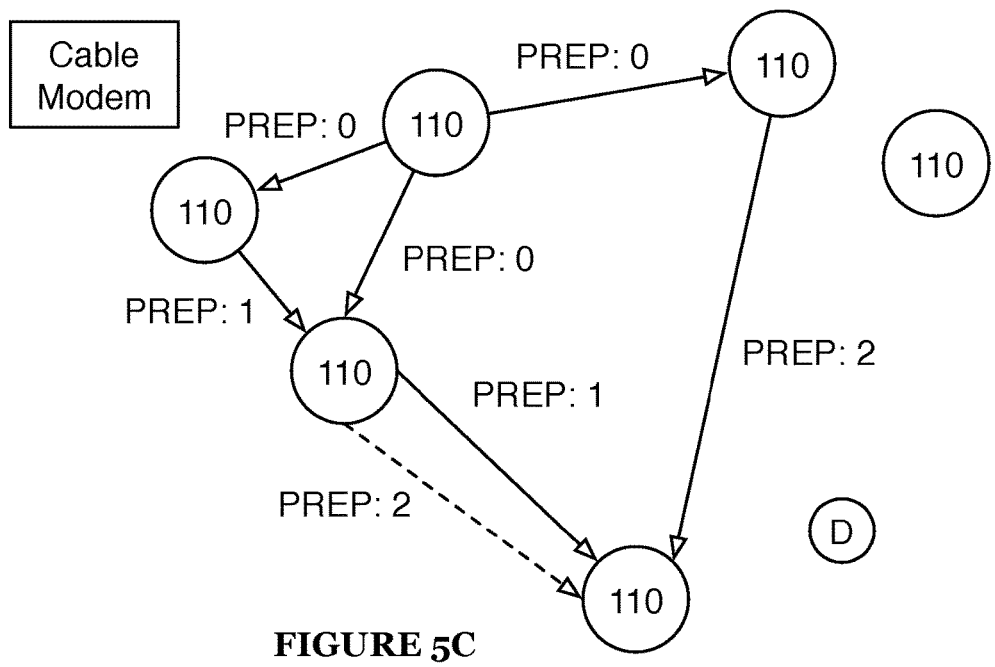
Figure 5D:
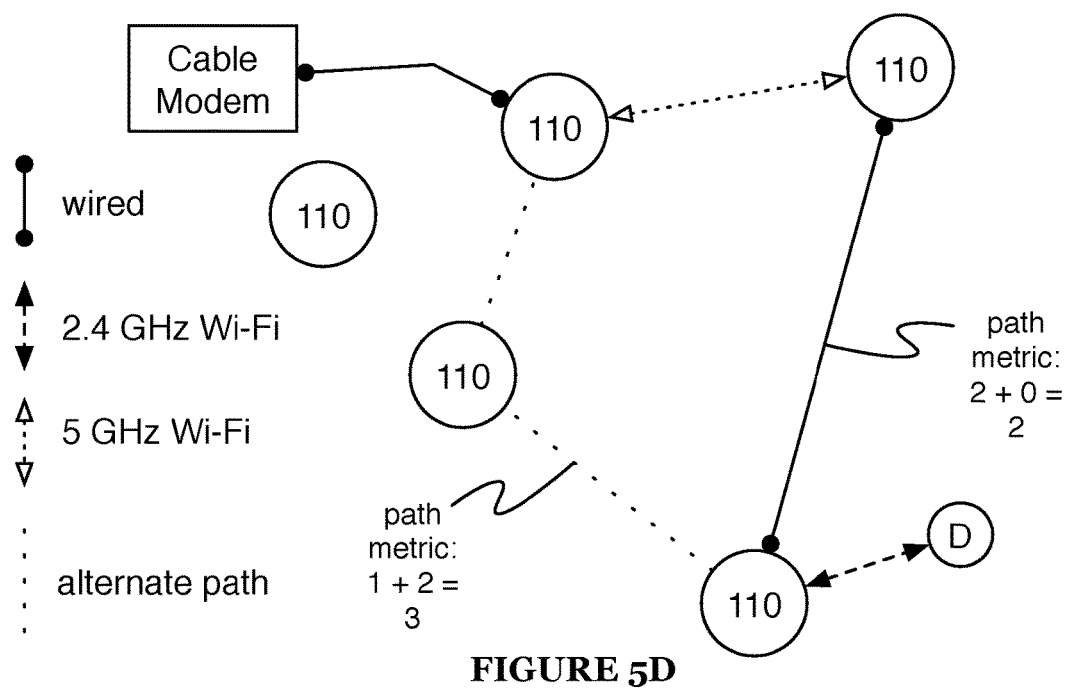
FIG. 5D is a network chart representation of a routing path in the example system of the invention embodiment.

As shown in FIG. 5A, a client device (D) attempts to send information to a cable modem on a mesh network having link metric values (e.g., link costs, such as costs which can be added to determine a path cost) as shown. The node connected directly to the client device (e.g., the AP for the client device) sends a path request (PREQ) message (e.g., for a path to the cable modem, a path to the gateway node connected to the cable modem, etc.), which propagates through the mesh network, possibly reaching the gateway node from multiple neighboring nodes (e.g., as shown in FIG. 5B). In response to receiving the path request from each neighbor, the gateway node sends a path reply (PREP) message to the neighbor from which the PREQ was received, including a path metric (e.g., zero in all cases, because the path begins at the gateway node). Each node receiving a PREP calculates the link metric associated with the node from which the PREP was received (e.g., the link cost for transmitting from itself to the node from which the PREP was received), adds the link metric to the path metric in the received PREP, and propagates the PREP (with the updated path metric) along the reverse path (e.g., as shown in FIG. 5C). The node connected directly to the client device receives one or more PREPs, calculates and adds the final link metric, and selects the path with the lowest total metric (e.g., as shown in FIG. 5D). Communication from the client device to the cable modem may be routed along this path.

The Bifrost metric preferably increases with (e.g., is directly proportional to) the airtime cost of queueing a given unit of data on a particular peer link, and is preferably comparable across link frequency (e.g., 2.4 and 5 GHz). The Bifrost metric can optionally be used (or modified) to account for Ethernet link quality, allowing comparisons not just across link frequency but also across wired and wireless links as well. The Bifrost metric can additionally or alternatively be set equal to zero (e.g., representing a no-cost link) or a small constant for Ethernet links, and/or can treat Ethernet links in any other suitable manner (or not be applied for Ethernet links).

In some embodiments, the mesh network includes multiple links between the same nodes, such as for nodes with multiple link interfaces (e.g., multiple radios capable of independent, simultaneous communication, multiple Ethernet ports, both radios and Ethernet ports, etc.). For example, two nodes can be simultaneously connected by multiple wireless links (e.g., in different bands, such as 2.4 GHz, 5.2 GHz, and/or 5.8 GHz) and/or Ethernet links. In one variation, each of these physical links can be treated independently (e.g., a link metric can be determined for any or all of them independently; paths through the network can specify the physical links individually, rather than just the endpoints of the links; etc.).

In a second variation, multiple physical links sharing endpoints (e.g., all such links, all such wireless links, a subset of such links, etc.) can be considered (e.g., from a link assessment and/or path selection perspective) as a single effective link (e.g., treated as a link aggregation group), wherein a single link metric associated with the effective link is determined, and paths specify the effective link rather than any of the specific underlying physical links within it. This variation can enable individual mesh nodes (and/or linked pairs of nodes) to select the optimal physical link(s) for communication with a given neighbor, without interfering with higher-level path selection (e.g., including enabling multiplex communication with the neighbor). In one example of this variation, each node of an effective link is specified by a single identifier such as a MAC address (e.g., highest or lowest MAC address; MAC address of the first-connected physical link; MAC address associated with a predetermined interface, such as a first Ethernet port or first wireless radio of the node, optionally even if the effective link does not include a physical link associated with the predetermined interface; etc.).

In this second variation, the effective link metric (e.g., link cost) associated with the effective link is preferably determined based on the physical link metrics of all or some of the underlying physical links. For example, the effective link metric can be equal to the best physical link metric, the sum of the physical link metrics, the inverse sum (e.g., inverse of the sum of the inverses) of the physical link metrics, the arithmetic and/or geometric mean of the physical link metrics, and/or any other suitable function of the physical link metrics (or of a subset thereof, such as the best two or three such links). The effective link metric can additionally or alternatively be determined based on performance of the effective link (e.g., simultaneous use of multiple physical links of the effective link) rather than individual performance of the underlying physical links. However, the effective link metric can additionally or alternatively be determined in any other suitable manner.

In one implementation of an invention embodiment, routers 110 include an autoprobing system triggered by Bifrost metric values. Because links that are idle or have 'bad' metrics may not see substantial traffic, nodes connected via these links may not receive regular metric updates (and therefore may not necessarily have the ability to modify configuration settings iteratively to improve metric values). The autoprobing system functions to generate traffic on links that are idle (e.g., below some activity threshold) and/or 'bad' (e.g., Bifrost metric below some threshold).

Alternative to the Bifrost metric, the system 100 may utilize a learned (or otherwise tuned) link metric that, in aggregate, promotes a particular goal across the network. For example, a learned link metric may be set based on the average latency across a network.

Tuning the learned link metric may include utilizing one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the method 200 can additionally or alternatively leverage: a probabilistic module, heuristic module, deterministic module, or any other suitable module leveraging any other suitable computation method, machine learning method or combination thereof. However, any suitable machine learning approach can otherwise be incorporated into link metric learning.

In another departure from the 802.11s standard, multicast and broadcast frames transmitted by the routers 110 preferably include an additional field specifying the band and/or channel (e.g., and/or the radio, such as a radio associated with a particular band) on which a router 110 saw a path announcement (e.g., path request or PREQ, path reply or PREP, etc.). In traditional 802.11s implementations, passing an announcement from one radio, band, and/or channel to another on the same node would result in a change of the sequence number. Consequently, the message is now treated differently by the network, and loops may occur. By tracking the radio field, the system 100 can allow paths containing links in multiple bands without suffering the looping issues present in the 802.11s implementation. Alternatively, some or all frames (e.g., multicast and/or broadcast frames) may not include this additional field.

Though not explicitly discussed previously, nodes in 802.11s systems track PREQs based on whether they have been received before or not (discarding them if so). The system 100 preferably implements a novel method of storing frame information and deciding whether to forward multicast frames that departs from the traditional 802.11s implementation. For each multicast frame received, routers 100 preferably hash a portion (e.g., unique portion) of the frame (e.g., the source address of the frame and/or packet header, the entire frame and/or packet header, the frame and/or packet contents, the entire frame and/or packet, etc.) and store the hash along with an expiration timer. The router 100 preferably maintains a list of the several most recent multicast frames received from each source (e.g., 16) along with a TTL value and an expiration time. If the router 100 receives a multicast frame from a source within the expiration time of a record stored with that router 100, the router 100 decrements the stored TTL and forwards the frame. When the stored TTL reaches zero, the frame will be discarded instead of forwarded. As each node has an RCU protected hash table of these lists, lookup is easily parallelizable, providing efficiency gains over standard 802.11s implementations. This multicast cache may be shared between wireless and wired interfaces, preventing loops and enabling both wired and wireless connections to be used in the network.

In a variation of an invention embodiment, the system 100 includes an additional layer on top of the link metric system described above. In this variation, routers 110 maintain a distributed Quality of Service (QoS) based system where a given router 110 will issue traffic credits to other nodes in their wireless collision domain. These traffic credits may place restrictions on when neighboring nodes can send data to a router 110, allowing the system 100 to reduce collisions in a coordinated fashion. Similarly to link metrics, the system 100 may utilize machine learning to distribute and/or regulate traffic credits in such a system.

The system 100 preferably uses link metrics for routing as described above, but the system 100 may additionally or alternatively use calculated link metric values as a proxy for live throughput values as an estimation of network health. For example, a network health metric for a network with L links may be found as follows:

$$H = \frac{1}{L}\sum_{l}^{L} M_l \times U_l$$

where $U_l$ is a utilization factor (this is essentially an average link metric weighted by link utilization). The system 100 may additionally or alternatively use link metric values to estimate network health in any manner.

In addition to the aforementioned techniques for increasing network performance, the system 100 may additionally or alternatively perform techniques to force client devices to move access points. This may be useful, for example, to better distribute client devices across wireless access points (APs). For many mobile electronic devices (e.g., most smartphones), device users (and APs, for that matter) have very little control over how the device chooses a wireless network. In most cases, wireless clients connect to a network and remain connected to it until signal quality (or another metric of communication quality) drops below a static threshold, at which point the clients disconnect and search for the strongest signal. In networks having APs with overlapping wireless ranges (especially dense mesh networks), this means that frequently a client initially connected to AP1 may move closer to AP2 than AP1, but will still remain connected to AP1 (because AP1 signal hasn't dropped below a threshold).

Forcing a client disconnect preferably causes such a device to re-check what the strongest AP is and connect to it. Note that while AP signal strength is correlated with distance from the AP, interference and noise may mean that the strongest AP is not necessarily the closest. For example, a smartphone is in a living room near a wall, and the living room AP is ten feet away. A bedroom, having a bedroom AP, is on the other side of the wall. In such a situation (based in part on attenuation due to the wall), the smartphone may see the living room AP as "closer" (i.e., it sees a higher signal strength). Forcing a client connection change may have numerous changes beyond localization, including optimization of mesh networking parameters, network load balancing, and/or wireless interference management. For example, in order to enhance network performance, a client can be forced to disconnect from a first AP and to instead connect to a second AP, even if the client-second AP link is worse (e.g., associated with lower throughput) than the client-first AP link. In a first specific example of this example, the path cost from the first AP to the internet is much higher than the cost from the second AP to the internet, such that the overall client-internet path cost is lower when the client is connected to the second AP. In a second specific example, the link between the first AP and a second client (e.g., a client that is unable to connect to the second AP) can be improved by disconnecting the first client from the first AP (e.g., thereby enabling strong beamforming to enhance the quality of the second client-first AP link). However, client connection changes can additionally or alternatively be controlled in any other suitable manner for any other suitable reason.

A router 110 may force a client connection change in any manner. In a first example, the router 110 may remove a client from an access point by blocking the MAC address (or another identifier) of the client at the access point and actively kicking the client off of the access point; this prevents the client from reconnecting until the MAC address is unblocked. Alternatively, the router 110 may disconnect a client from an AP without preventing the client from rejoining that AP.

In a second example, a router 110 may rescind credentials for a particular device. In the second example, the router 110 may include rescind credentials in any manner; for example, by rescinding access to an AP using a set of credentials associated with the device or with a user of the device. In some cases, these credentials may be device or user specific (e.g., a certificate stored on a smartphone, a username/password) but additionally or alternatively, the credentials may be non-device-specific (e.g., an AP password for a WPA-2 personal secured AP).

The router 110 may additionally or alternatively disconnect a client from an AP in any other manner (e.g., by lowering transmit power of the AP to force client roaming). Note that the system 100 may, by controlling the access points a client can connect to, force a client to connect to a specific AP (or one of a set of APs). For example, a mesh network may include four APs within range of a device: AP1, AP2, AP3, and AP4. By blocking the device from connecting to AP1 and AP2, the network may force the device to connect to one of AP3 or AP4. Likewise, AP3 could also be blocked to force the device to connect to AP4.

The preceding examples are operable even when APs have limited control over client roaming. However, in some cases, a network may have more substantial control over client roaming (or may even be able to designate which network the device connects to explicitly). In these cases, the system 100 may additionally or alternatively modify client roaming parameters and/or direct the device to connect to a specific AP or a set of APs.

The system 100 may direct AP modification in any manner. For example, routers 110 may store link quality metrics for the links between APs and client devices, and may disconnect client devices if they fall below a threshold. As another example, routers 110 may evaluate client links by latency to the client (this latency may be scaled based on the type of client device).

The system 100 may attempt to distribute clients among routers 110 (and radios of those routers 110) based on any number of factors, including the type of device (e.g., smartphone, laptop, etc.), model of device (e.g., Galaxy, iPhone), bandwidth usage of device (e.g., high bandwidth, low bandwidth), mobility of device (e.g., as determined by RSSI changes or by AP changes), frequency of communication, etc.

In addition to actual client link quality metrics, the system 100 may additionally or alternatively distribute client devices based on contextual or historical data. For example, a computer used during the day for large downloads and at night for gaming may be switched between a connection (e.g., a wireless link to an AP, a path through the network to the internet, etc.) having high throughput and/or high latency (during the day) and one having low throughput and/or low latency (during the evening).

While the system 100 has been described for situations in which traffic generally has a known destination, there are circumstances in which traffic may have multiple potential destinations (e.g., the case in which a mesh network has several gateways to the internet). In a variation of an invention embodiment, the system 100 may perform sharing traffic across multiple internet connections. For example, the system 100 may designate primary and secondary (and tertiary, and so on) internet connections, used by all devices on a particular network. The system 100 may additionally or alternatively designate internet connections by device (e.g., all devices in the 192.168.1.xxx subnet use a particular connection, all smartphones use a particular connection, etc.), or by TCP stream (or at any other sub-device resolution level); for example, high bandwidth, latency insensitive applications (e.g., streaming video) may use a first connection, while low bandwidth, latency sensitive applications (e.g., real-time online gaming) may use a second connection.

Traffic sharing may be performed based on any suitable input data. For example, traffic sharing may include altering NAT configuration based on available bandwidth (e.g., a particular connection is only used until a bandwidth cap is reached), price (e.g., expensive connections may be used only when necessary for a particular application), or any other criteria. Traffic sharing agreements are preferably determined by the router management platform 120, but may additionally or alternatively be determined by any suitable entity.

Traffic sharing can also be accomplished via network load balancing algorithms, whereby IP traffic is distributed over the multiple internet connections in order to meet one or more network goals. Examples of network goals may include reducing response time for one or more devices on the network, increasing bandwidth available to one or more devices on the network, increasing performance for particular services or types of traffic on the network, increasing reliability of internet access for devices on the network, etc. A first example of a network load balancing algorithm for traffic sharing is a round robin algorithm. The round robin algorithm allocates a first IP traffic request to a randomly selected first internet connection, a second traffic request to a second internet connection that is randomly selected except that it excludes the first, and so on until all internet connections have been allocated at least once, at which point the cycle repeats. Round robin works well when most traffic requests are roughly equal in bandwidth demand and duration. A second example of a network load balancing algorithm is dynamic round robin. Dynamic round robin works similarly to the base round robin algorithm except that the allocation step is distributed according to a weighting scheme discerned from real-time internet connection performance. Dynamic round robin can eschew the problem of multiple high traffic requests being routed over the same internet connection. A third example of a network load balancing algorithm is a predictive algorithm. A predictive algorithm can monitor real-time internet connection characteristics (e.g., which internet connections have the fewest IP traffic requests on them, which internet connections have the largest data stream allocations on them, etc.) and historical internet connection characteristics (e.g., a time series of monitored download and upload speeds over a recent time period) in order to determine which internet connections are improving or declining in performance over time (as quantified in a metric of performance), can feed these metrics of performance into a dynamic weighting scheme, and can allocate new IP traffic requests according to the dynamic weighting scheme. Alternatively, any suitable network load balancing algorithm can be implemented by the system 100.

The manner in which the system 100 performs load balancing can be predetermined (e.g., traffic can be proportionally distributed across internet connections), dynamically determined (e.g., at the time of a user request, the particular request can assign a priority, and then the routers can handle load performance in accordance with the priority hierarchy of all network traffic), or determined in any other suitable manner.

Embodiments of the method 200, described below, can optionally implement some or all of the network assessment and/or management techniques described above regarding the system 100. Such techniques are preferably performed using the system 100, but can additionally or alternatively be performed using any other suitable network or other system.

2. Method for Enhanced Mesh Networking

Figure 6:
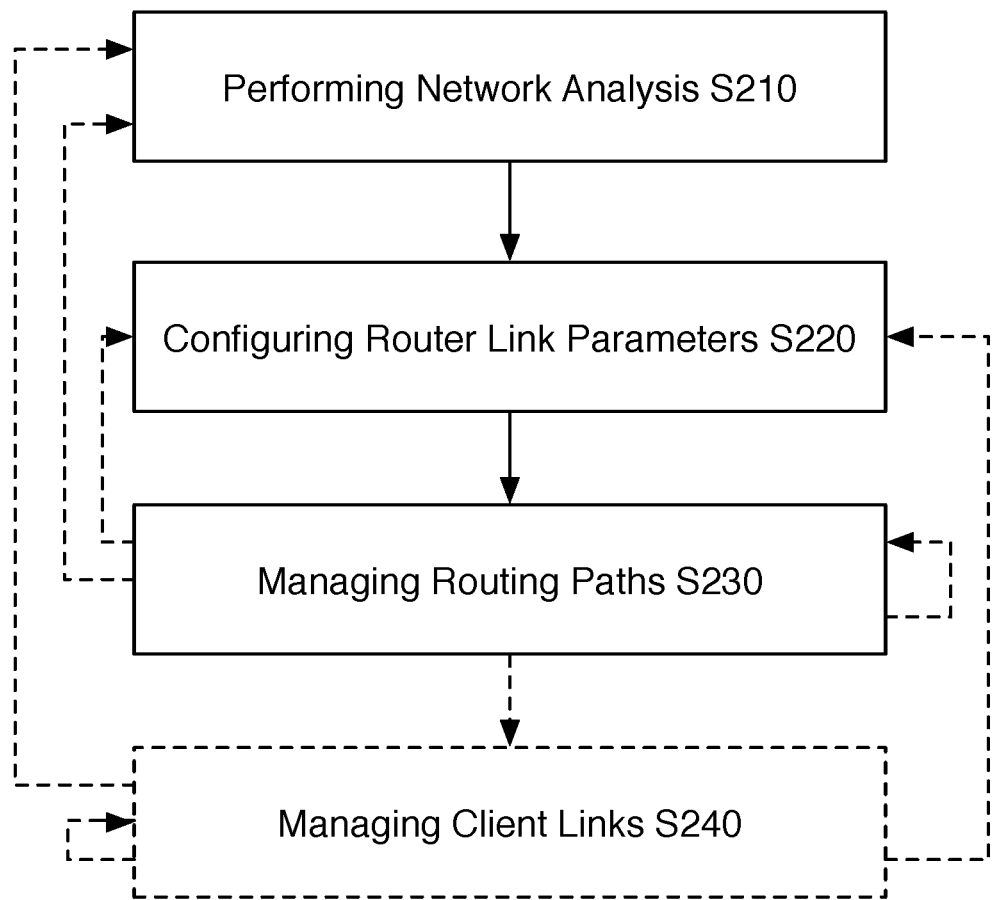
FIG. 6 is a chart representation of a method of an invention embodiment.

A method 200 for enhanced mesh networking preferably includes performing network analysis S210, configuring router link parameters S220, and managing routing paths S230, as shown in FIG. 6. The method 200 may additionally or alternatively include managing client links S240 and/or any other suitable elements.

The method 200 preferably functions to effectively configure and manage a mesh network (e.g., a network operating on multiple frequency bands, and potentially bridged by Ethernet links) by efficiently assigning router communication parameters and determining routing paths based on discovered link metrics.

The method 200 is preferably performed by the system 100, but may additionally or alternatively be performed by any mesh network (e.g., any multi-band mesh network).

S210 includes performing network analysis. S210 functions to determine network state information. For example, S210 may function to determine the number of mesh nodes (e.g., routers) in a network, individual configuration details for each node (e.g., wireless communication channels, channel width, Ethernet capabilities, wireless mode, encryption type, QoS configuration, DHCP configuration, NAT configuration), their proximity to one another, the connection type and quality between nodes, the number of client devices in a network, individual configuration details for each client device (e.g., client type, client AP, client wireless communication channel, client Ethernet capabilities), connection type and quality between clients and nodes, overall network throughput, WAN gateway details, etc.

S210 may include performing network analysis in any manner. For example, S210 may include querying devices on the network, performing network surveys from devices on the network, requesting user input, or any other technique. S210 may additionally or alternatively include logging network data and using this data to perform network analysis. For example, S210 may including logging link (either inter-router links or client-router links) throughput and error rate to determine link quality.

S210 is preferably performed by one or more routers of a mesh network, but may additionally be performed by or aided in performance by a mobile client device (e.g., a smartphone) running a network monitoring app. For example, S210 may include collecting network data from a smartphone as a user moves around in a mesh network.

S210 may additionally or alternatively include requesting network analysis data from a network user. For example, S210 may include asking a user to notify a management app on a client device if the network is ever not working ideally (triggering the network to log data particular to the client device and/or time).

S210 is preferably run during initial network configuration, but may additionally or alternatively be run at any time in order to better inform network configuration.

S220 includes configuring router link parameters. S220 functions to configure communication links between routers.

For each mesh node, S220 preferably includes initializing links to every other mesh node within communications range. These links may then be used (or not used) depending on routing needs. Additionally or alternatively, S220 may include initializing links to only a subset of mesh nodes within communication range. For example, S220 may include initializing links only to nodes of a certain type, nodes with a signal-to-noise (SNR) above some threshold, nodes with a Rx/Tx throughput above some threshold, nodes not connected via Ethernet, etc. As a second example, if there are m nodes within range of the node, S220 may include initializing links to n of m nodes based on some criteria (e.g., the five nodes with lowest latency).

S220 may additionally or alternatively include modifying wireless communication channels of mesh nodes. S220 preferably includes setting wireless channels to reduce interference and increase throughput of the network, but may additionally or alternatively set wireless channels to achieve any goal.

S220 may include, for example, setting nodes initially to the same 5 GHz channel, but setting nodes to diverse 2.4 GHz channels. Such a configuration may enable nodes to communicate with each other (and potentially client devices) over the 5 GHz band, while optimizing the 2.4 GHz band to communicate with client devices.

In another example, S220 includes determining $D_{c2.4}$ (the percentage of airtime arising from router-client communication on the 2.4 GHz band), $D_{c5}$ (the percentage of airtime arising from router-client communication on the 5 GHz band), $D_{m2.4}$ (the percentage of airtime arising from router-router communication on the 2.4 GHz band), and $D_{m5}$ (the percentage of airtime arising from router-router communication on the 5 GHz band) for each node of the network, as well as $P_{2.4}$ and $P_5$ (signal proximity; e.g., as measured by beacon SNR). In this example, S220 preferably sets the 2.4 and 5 GHz channels of each node $C_{2.4}$ and $C_5$ by attempting to minimize the following:

$$f_5 + f_{2.4}$$

where $$f_{2.4} = \sum_{\substack{l,k \\ 2.4\,GHz}} K_1(K_2 + B[C_l, C_k])(D_{c,l} + D_{c,k})P_{l,k} + K_3(K_4 - B[C_l, C_k])(D_{m,l} + D_{m,k})P_{l,k}$$

$$f_5 = \sum_{\substack{l,k \\ 5\,GHz}} K_5(K_6 + B[C_l, C_k])(D_{c,l} + D_{c,k})P_{l,k} + K_7(K_8 - B[C_l, C_k])(D_{m,l} + D_{m,k})P_{l,k}$$

where $K_1 \ldots K_8$ are constants, B is a binary operator on channels (e.g., B is zero if $C_j \neq C_k$ and one if $C_j = C_k$). This metric is minimized when nearby nodes with a lot of router-client communication on a given band are on different channels and when nearby nodes with a lot of router-router communication on a given band are on the same channel. Of course, since router-to-router communication may be highly dependent on channel settings, this metric may be evaluated iteratively according to any minimization algorithm.

As a third example, S220 may include setting network channels by randomly varying channel settings (or otherwise varying channel settings) and monitoring network performance using a machine learning algorithm, eventually learning an optimal network channel state.

S220 may additionally or alternatively include restricting traffic on a particular band for a particular purpose. For example, S220 may include, on a given node, limiting 5 GHz traffic to backhaul traffic and 2.4 GHz traffic to router-to-device traffic.

S220 may additionally or alternatively include attempting to modify any other parameters related to inter-router links. For example, S220 may adjust antenna patterns and/or gain to reduce network interference. Additionally or alternatively, S220 may include configuring nodes to perform beamforming or beam-steering (potentially with dynamic gain) for the same purpose.

S230 includes managing routing paths. S230 functions to determine paths across the network (e.g., across the mesh and/or Ethernet links) for a given source and destination. S230 preferably includes managing routing paths according to the IEEE 802.11s Hybrid Wireless Mesh Protocol (HWMP) (e.g., according to a modified version of the protocol, such as the modified versions described above regarding the system 100), but may additionally or alternatively use any technique for determining pathing. S230 may, for example, include creating and/or updating routing paths using reactive and/or proactive routing techniques as described in the IEEE 802.11s standard, with the same deviations from this standard as described in the system 100 sections on pathing.

S230 preferably includes maintaining at each node a multicast frame dataset, the dataset containing historical multicast information for each source. For example, the dataset may contain references to the 16 most recent multicast frames for each source seen by the node. Each reference is preferably linked to a time stamp; if the difference in time between frames from the same source is below a threshold, the second frame may not be forwarded by the node. Alternatively, the dataset may maintain TTL for each entry (e.g., so if subsequent frames (such as a second frame, third frame, fourth frame, etc.) are received less than the threshold time after a first frame, each forward decrements TTL, and not all frames may be forwarded). This multicast cache is preferably stored as an RCU protected hash table, leading to easily parallelizable lookup and providing efficiency gains over standard 802.11s implementations. Likewise, this cache is preferably shared across communication modalities.

S230 preferably includes determining routing paths using the Bifrost metric described in the sections on the system 100, but may additionally or alternatively utilize any suitable link metric(s). S230 can optionally include implementing the STAMP technique described below, but can additionally or alternatively use any other suitable techniques to enable incorporation of Ethernet segments (e.g., including legacy Ethernet devices incompatible with typical mesh networks) into the mesh network, or can use no such technique.

In a variation of an invention embodiment, S230 includes routing traffic according to a distributed Quality of Service system, where nodes issue traffic credits to other nodes in their wireless collision domain. These traffic credits may place restrictions on when neighboring nodes can send data to a node, allowing the network to reduce collisions in a coordinated fashion.

In addition to calculating link metrics for links of the network, the method 200 may additionally or alternatively include estimating network health and/or throughput based on the overall link metrics of the network. For example, the method 200 may include measuring the network's total throughput, or a weighted average of throughput per node (weighted by node importance and/or traffic).

S240 includes managing client links. S240 may include modifying any aspect of node-to-client-device communication; for example, QoS parameters, connection type (e.g., 802.11g vs. n vs. ac), connection modality (e.g., Ethernet vs. Wi-Fi vs. Bluetooth), connection speed, etc.

S240 may additionally or alternatively include optimizing client links by moving client devices from one node to others. This may be used to more evenly distribute client devices according to bandwidth availability and interference likelihood. Note that the same algorithms used to determine channels may also be used with varying client AP connections. For example, the previous formulae $f_5+f_{2.4}$, where $$f_{2.4} = \sum_{l,k} K_1(K_2 + B[C_l, C_k])(D_{c,l} + D_{c,k})P_{l,k} +$$
$$\phantom{f_{2.4} = } 2.4\,GHz$$

$$K_3(K_4 - B[C_l, C_k])(D_{m,l} + D_{m,k})P_{l,k}$$

$$f_5 = \sum_{l,k} K_5(K_6 + B[C_l, C_k])(D_{c,l} + D_{c,k})P_{l,k} +$$
$$\phantom{f_5 = } 5\,GHz$$

$$K_7(K_8 - B[C_l, C_k])(D_{m,l} + D_{m,k})P_{l,k}$$

may be varied not only in AP channel, but by forcing clients to join particular APs, $D_c$ for affected APs will be modified.

S240 may include forcing a client disconnect, preferably causing such a device to re-check what the strongest AP is and connect to it. As previously discussed, forcing a client connection change may have numerous changes beyond localization, including optimization of mesh networking parameters, network load balancing, and/or wireless interference management.

S240 may include forcing client connection changes in any manner, as discussed in the sections covering the same techniques in the description of the system 100. S240 preferably includes distributing clients across nodes in a manner that maximizes both overall network throughput and reliability as well as performance for individual devices on the network. S240 may include distributing clients across nodes based on any number of factors, including the type of device (e.g., smartphone, laptop, etc.), model of device (e.g., Galaxy, iPhone), bandwidth usage of device (e.g., high bandwidth, low bandwidth), mobility of device (e.g., as determined by RSSI changes or by AP changes), frequency of communication, historical connection quality data, historical bandwidth usage, etc.

S240 may additionally or alternatively include requesting manual user intervention. For example, S240 may include directing a user to rotate and/or relocate one or more nodes of the network in order to increase network efficiency.

S240 may additionally or alternatively include requesting any type of user network configuration intervention (including providing instructions for changing network device configurations in software, rerouting Ethernet cables, moving wireless access points, etc.). S240 preferably enables the user (most preferably by means of software operating in conjunction with a remote management platform, but alternatively otherwise) to easily implement the desired configuration changes. In a second example, the user can confirm that the network configuration performed by the earlier steps are appropriate. In this second example, the user is given instructions through software on an external electronic device; per the instructions, the user can then reconfigure network configuration settings when the reconfiguration includes physical modifications to network features (e.g., disconnecting routers which were previously physically tethered by an Ethernet cable).

The method 200 (and/or any suitable elements thereof) can be performed once, repeatedly (e.g., periodically, sporadically, in response to trigger occurrence, etc.), and/or with any other suitable timing. For example, the method 200 can include continuously assessing link metrics and repeatedly (e.g., periodically, in response to PREQ receipt, etc.) re-determining routing paths based on the metrics.

3. Segment Table Announced Mesh Protocol (STAMP)

A common problem in traditional mesh networks that include legacy Ethernet segments is that many Ethernet devices with more than one Ethernet port, including switches, routers, bridges and client devices contain a structure generally referred to as an address resolution list or forwarding database. These devices use this ARL or FDB in order to quickly determine which of their multiple ports leads to a given MAC. Given that Ethernet frames only contain two addresses—destination and source—and the Ethernet protocol is connectionless, the only means of determining where a given MAC is located on an Ethernet network is by snooping the source address of frames coming from that port.

A traditional Ethernet switch, upon receiving a frame, compares it to the addresses currently in its ARL, and if it finds it, will then deliver it to the port noted in the ARL. If it does not find the frame, it will flood it to every port other than the one it came in on. Having done this, it notes that the source address on the frame is present on whichever port it came in on.

This is problematic in mesh networks, because mesh networks may not guarantee to deliver frames to attached Ethernet segments in a deterministic fashion. This means that Ethernet switches in such a segment may become confused by traffic that appears to come from random locations. Moreover, since every mesh node bordering an Ethernet segment will see traffic that has come from the mesh when it lands on the segment, they may decide to take the frames and inject them back into the mesh. This traffic then moves through the mesh and is reinserted back into the Ethernet segment repeatedly, causing the network to eventually become clogged by looping frames.

Problems of looping are solved in wired Ethernet networks using the well-known Spanning Tree Protocol (STP). Unfortunately, since this works on a per-bridge-port basis, it is not well suited to meshes where a single bridge port may represent dozens of peer links. Moreover, meshes may have intrinsically cyclic topologies, and derive many of their reliability benefits from the multiple paths allowed by such cyclic structures. Spanning Tree Protocol, which is designed to make a network acyclic, may not be a good fit for such networks, even if it is extended to handle mesh links on a per-peer-link basis.

Problems of looping frames in wireless mesh networks may be solved because the routing algorithm does not allow unicast frames to loop, each frame has a mesh header including a mesh time-to-live, and multicast frames are checked against a hash table of recent multicast frames, allowing them to loop through each node only once. However, Ethernet's small header may not allow this technique to be used.

Segment Table Announced Mesh Protocol (STAMP) (e.g., Spanning Tree Announced Mesh Protocol) is an adjunct protocol which builds upon facilities provided by the IEEE 802.11s mesh networking standard in order to make it possible to deterministically deliver frames from mesh networks to legacy IEEE 802.3 Ethernet clients.

STAMP preferably includes determining one or more segments of the network (e.g., the LAN). Each segment is preferably a portion of network-connected devices that are mutually connected by a homogeneous connection type (e.g., wherein all devices of a wireless segment are connected by wireless links, all devices of an Ethernet segment are connected by Ethernet, etc.), such as shown in FIGS. 7B-7C. However, the segments can be connected by heterogeneous connection types, multiple connection types (e.g., wired and wireless), or by any other suitable set of connections. The segments do not necessarily correspond to broadcast or collision domains. For example, the entire network (e.g., including multiple segments, such as two wireless mesh segments bridged by an Ethernet segment) can define a single broadcast domain (or alternatively, can include multiple broadcast domains, such as VLANs defined independent of the segments), and a single segment can include multiple collision domains (and/or collision domains can extend into multiple segments).

Each segment preferably includes all devices reachable by links of similar type (e.g., reachable using only wireless links or only Ethernet links). However, the segments can alternatively exclude some such devices. In one example, segment definition can include a link quality threshold, wherein links below a threshold quality (e.g., threshold link metric value, such as a Bifrost metric value) are not ignored (e.g., devices connected only by such a link would not be considered to be in the same segment). In a second example, wireless segments can exclude wireless links between nodes that are also connected by Ethernet (e.g., wherein the wireless segment is limited to devices that must communicate with each other wirelessly, rather than including all devices that can communicate with each other wirelessly). In a variation of this example, the method includes assessing (e.g., determining a link metric for) the Ethernet links between such nodes, wherein the associated wireless link is only excluded if the Ethernet link metric is better than a threshold (e.g., better than the wireless link metric, better than a predefined threshold, etc.). In a third example, each segment can be arbitrarily divided into sub-segments. For example, a segment can be divided into a number of sub-segments equal to the number of potential forwarding devices in the segment, wherein each potential forwarding device is designated as the forwarding device for a different sub-segment. However, the segments can additionally or alternatively be defined in any other suitable manner.

Determining the segments preferably includes identifying each Ethernet segment and each wireless segment. However, determining the segments can additionally or alternatively include identifying only Ethernet segments, identifying only wireless segments, identifying only a subset of such segments, and/or determining any other suitable segments. Determining the segments can optionally include determining the members (e.g., connected devices) of some or all of the identified segments. The segments are preferably determined by the mesh nodes, such as by STAMP-capable nodes that are both in a mesh segment and in an Ethernet segment (e.g., nodes that connect a mesh segment to an Ethernet segment). Preferably, the network does not include any mesh nodes that also have Ethernet connections but are not STAMP-capable, but alternatively the network can include any suitable nodes.

One embodiment of STAMP uses the IEEE 802.1d Spanning Tree Protocol to map the Ethernet segments (e.g., wired Ethernet segments) attached to each node, making their topologies acyclic in the ordinary manner (e.g., the manner specified by STP). STP determines a unique "root bridge address" for each contiguous Ethernet segment. Another embodiment of STAMP propagates other messages (e.g., in addition to or in place of STP messages) in order to identify the Ethernet segments and/or their members. The STAMP-capable nodes are preferably configured not to send STP messages and/or any other Ethernet segment mapping messages into the mesh segments. Thus, such messages will propagate only within a single Ethernet segment (e.g., will not propagate through the wireless mesh), enabling the technique to distinguish between two non-contiguous Ethernet segments.

However, mesh networks do not have an equivalent of a root node address that can be used to identify them. Instead, contiguity of mesh networks may be determined by having each STAMP-capable node (or a subset thereof, such as each node connected both to an Ethernet segment and a wireless segment) send a broadcast message (the "STAMP announcement") into the wireless segment to which it is connected. The STAMP announcement preferably includes the identifier (e.g., as described above) of the wired Ethernet segment the sending node is connected to, as well as an identifier associated with the sending node (e.g., sending node MAC address). These broadcast messages are preferably tagged with a special ethertype, and STAMP-capable nodes are preferably configured to drop messages with the special ethertype at the mesh boundary (e.g., configured not to forward them to Ethernet segments); that is, it does not propagate outside of the wireless mesh.

STAMP-capable nodes receive these STAMP announcement messages and build a list of every Ethernet segment visible from their mesh, wherein each Ethernet segment is associated with an identifier (e.g., the root bridge address, the highest or lowest MAC address of the Ethernet devices in the segment, etc.), and determine from the identifiers (e.g., the announced root bridge addresses) which mesh nodes are members of the same Ethernet segments.

The STAMP announcements can optionally include one or more STAMP metrics, such as metrics associated with the sending node. These metrics preferably include a network segment centrality and/or connectivity metric (e.g., representing how good the node's connection to the rest of the mesh segment is). In one variation, the STAMP metric of a node is determined based on the peer links of the node (e.g., all wireless peer links within the mesh segment, all Ethernet peer links, all peer links of any type, etc.), such as being equal to the sum of the bitrates of the peer links or equal to the number of peer links. In a second variation, the STAMP metric is determined based on one or more HWMP metrics associated with the node, such as the metrics described above regarding the system 100 (e.g., Bifrost metrics, learned and/or tuned metrics, etc.). For example, the STAMP metric of a node can be equal to the average of the path metrics between the node and each other member of the wireless segment (e.g., simple average, load-weighted average, etc.). However, the STAMP announcements can additionally or alternatively include any other suitable STAMP metrics.

Figure 7A:
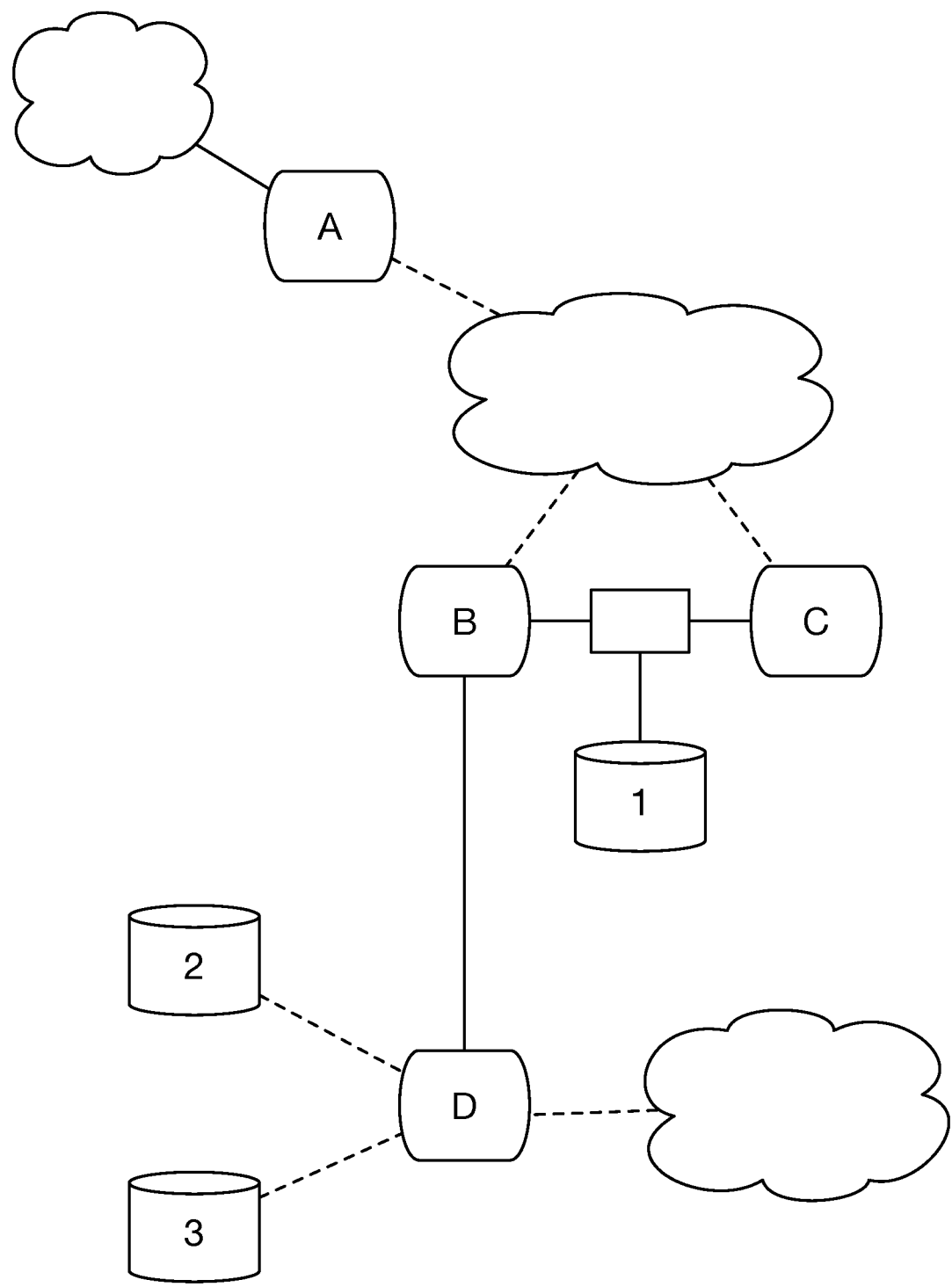
FIG. 7A is a network chart representation of an example network using STAMP.
Figure 7B:
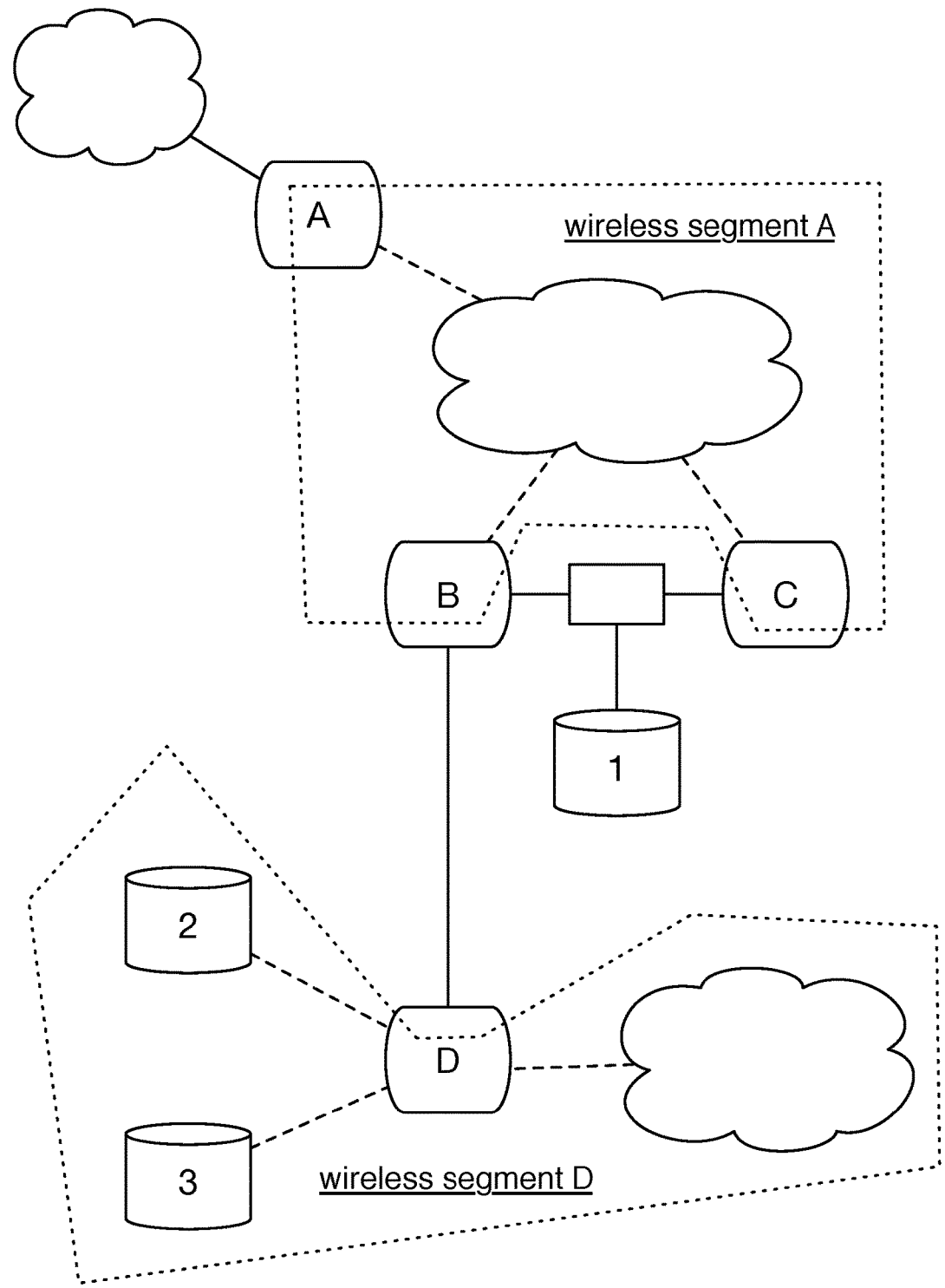
FIGS. 7B-7D are views of the network chart representation of FIG. 7A, depicting wireless segments, Ethernet segments, and potential forwarding devices, respectively.
Figure 7C:
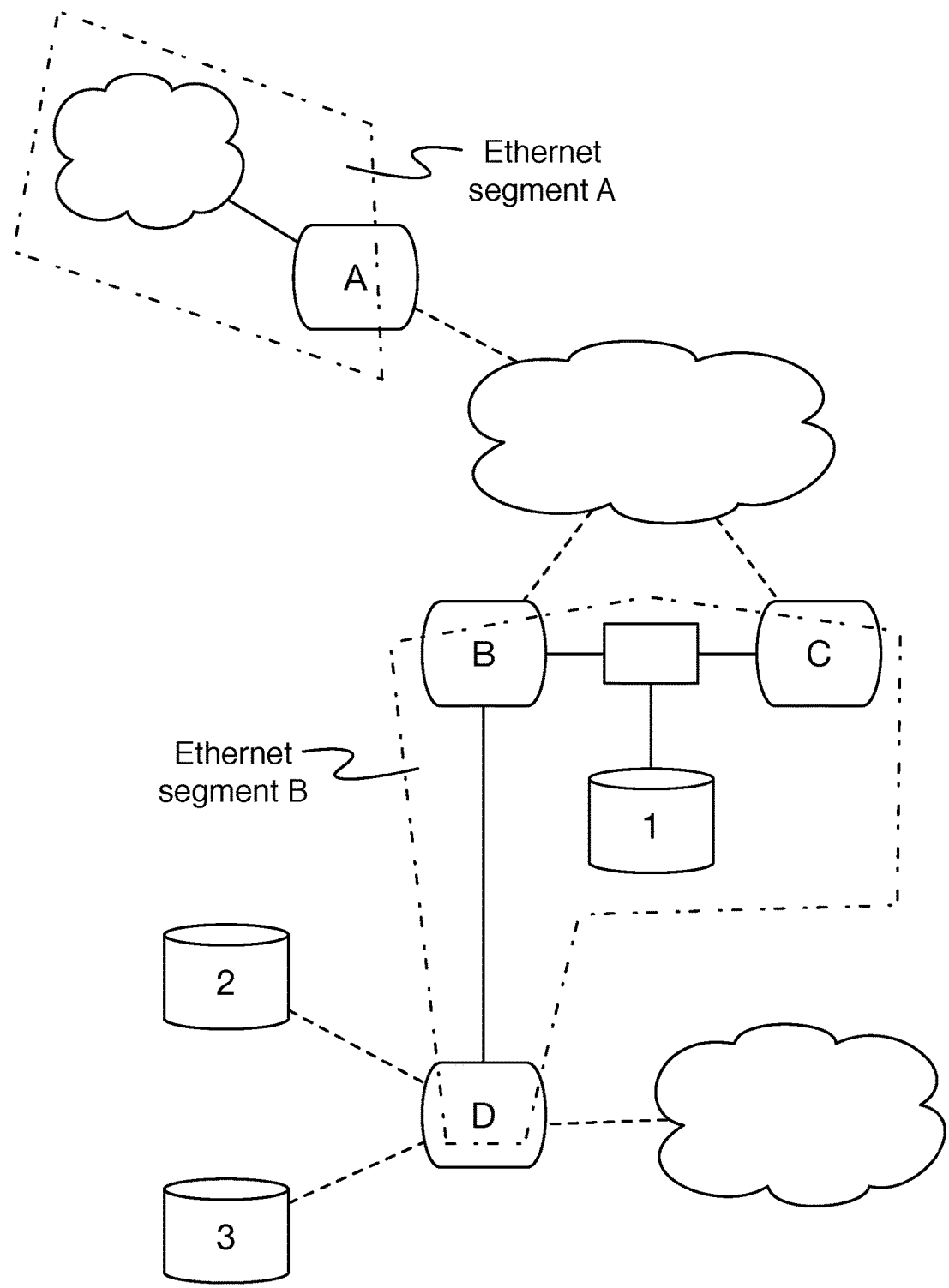
Figure 7D:
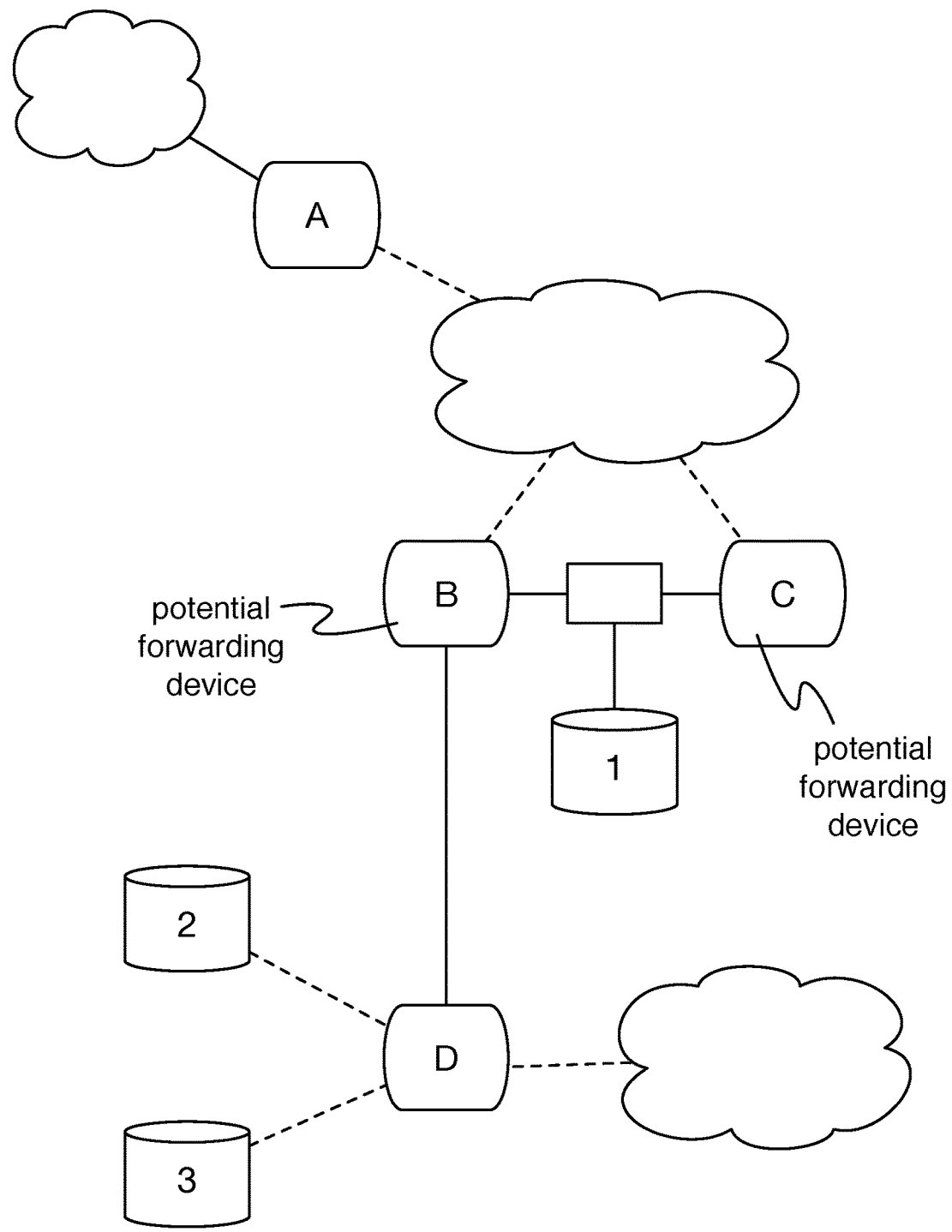

The STAMP metric (or metrics) is preferably used in order to determine (e.g., elect) a forwarding device (e.g., "designated forwarder") for each adjacent wireless segment-Ethernet segment pair (e.g., each place that a given mesh touches a given Ethernet segment), such as shown in FIG. 7D for the wireless segment A-Ethernet segment B segment pair. However, the forwarding device can be otherwise determined at any suitable time (e.g., at a predetermined frequency). For example, for each such segment pair, the method 200 can include determining each mesh node that belongs to (e.g., is connected to) both the given wireless segment and the given Ethernet segment (e.g., the set of potential forwarding devices), and then, based on the STAMP metric associated with each potential forwarding device, designating one as the forwarding device for that pair (e.g., the mesh node with the best STAMP metric). The designation is preferably determined independently at each mesh node of the wireless segment (e.g., using an identical algorithm based on identical information), but can alternatively be determined by a single node or other device (e.g., wherein the determination is then sent to the devices of the wireless segment, such as included in subsequent STAMP announcements). The method can optionally include designating one or more backup forwarding devices (e.g., in a ranked order, in a pool, etc.), preferably wherein the backup forwarding device can assume the forwarding device role if the designated forwarding device becomes unresponsive (e.g., due to device failure, network partition, etc.).

The designated forwarding device is preferably responsible for moving frames between the wireless and Ethernet segments (e.g., receiving frames from the wireless segment and transmitting them into the Ethernet segment, receiving frames from the Ethernet segment and transmitting them into the wireless segment, etc.). In one example, the designated forwarding device is responsible for moving frames multicast frames and/or broadcast frames on the mesh onto the Ethernet segment, and for moving unicast frames from the mesh not already present on the Ethernet segment onto the Ethernet segment. In order to determine whether a frame should be copied in this way, it can be necessary to do a lookup to see if its origin is already a member of the same Ethernet segment as the designated forwarder; if it is, then we can assume that it already injected it onto the Ethernet segment, and the designated forwarder can leave it alone. In another example, the designated forwarding device is solely responsible for all inter-segment transmissions between the segments to which it is connected. However, the designated forwarding device can additionally or alternatively serve any other suitable role.

Flooded unicast frames are special, because there is no provision in the Ethernet header for marking them as such. The bridge that floods them does, however, know that it is flooding them, so they can be locally marked as flooded. This local marking is used by the mesh driver to mark the frames in the mesh header. Flooded unicast frames emerging from the mesh are treated similarly to multicast frames, so they are not injected into the Ethernet by multiple mesh nodes and therefore will always approach any switches on the Ethernet segment from the same direction if they come from the same address.

In order to know that a frame is coming from a node that is a member of the same Ethernet segment, the node's bridge must be able to check the STAMP lists against the mesh header, but by the time the bridge gets the frame the mesh header will have been stripped and discarded. In order to allow this check to take place, a second local marking scheme is used, and a call from the mesh driver into the bridge is used in order to check the list.

In this way, flooded unicast frames can be checked as if they were multicast frames, eliminating the chance of looping, and both unicast and multicast frames from the mesh will be delivered to all wired Ethernet segments in a predictable, deterministic way, avoiding the possibility of confusing switches on those segments. This allows wired Ethernets to be connected to meshes, between mesh segments, and even allows wired Ethernet bridges to be used between non-contiguous meshes without causing problems.

Other potential forwarding devices (e.g., those not designated as the forwarding device) associated with the segment pair preferably do not perform inter-segment forwarding for which the designated forwarding device is responsible. However, the potential forwarding devices can operate in any suitable manner. In one example, each such node can act as though it is two separate devices—one connected to the wireless segment and the other to the Ethernet segment—with no direct data link between them. In this example, transmissions received from the Ethernet segment will only be forwarded by the node within the Ethernet segment (e.g., to Ethernet devices connected to the node by Ethernet), and transmissions received from the wireless segment will only be forwarded by the node within the wireless segment (e.g., to wireless devices connected to the node by wireless links). In a second example, the node can determine a private sub-segment of devices that are connected to the rest of a segment only by the node and that does not include a designated forwarding device (or, in stricter versions, including only devices that are connected to the rest of the network only by the node, or including only client devices connected directly to the node and to no other devices), wherein the node is a "chokepoint" between the sub-segment and the rest of the network, and can perform inter-segment forwarding only for the private sub-segment. For example, in this second example, in response to receiving a broadcast frame from the Ethernet segment, the node can forward the broadcast frame to its private sub-segment of the wireless segment (preferably recording that the broadcast frame was received and forwarded to the private sub-segment only). When the node subsequently receives the same broadcast frame from the wireless segment (e.g., after forwarding into the wireless segment by the designated forwarding device), it preferably does not forward it to the private sub-segment, thereby preventing the devices of the private sub-segment from receiving the frame more than once.

Path selections (e.g., as described above regarding the method 200, such as regarding S230) between endpoints in different segments are preferably determined based on the forwarding device designations. In one variation, the method 200 only includes considering (e.g., determining path metrics for) STAMP-compliant paths (e.g., paths that respect the forwarding device designations, such as paths that cross between a first and second segment only at the associated forwarding device). In a second variation, other paths may also be considered, but only a STAMP-compliant path will be selected. In a specific example of this variation, if a non-compliant path metric is superior (e.g., by any amount, by greater than a threshold amount, etc.) to a STAMP-compliant path, the method can optionally include taking action that may change the STAMP designations, such as providing updated information for STAMP metric calculation, suggesting a STAMP metric adjustment (e.g., handicap based on the contrast in path metrics), and/or requesting re-determination of the forwarding device. In a third variation, the path metric (e.g., Bifrost metric) includes STAMP-related information (e.g., wherein non-compliance with the STAMP designations can penalize a link and/or path metric), but a non-compliant path may be selected. However, the STAMP designations can additionally or alternatively be integrated with the path selection process in any other suitable manner, or can alternatively not be integrated.

As shown in FIG. 7A, non-contiguous networks of mixed Ethernet and mesh are possible with STAMP. In FIG. 7A, the clouds represent mesh networks and cylinders represent client devices. STAMP nodes are represented by rounded rectangles and a legacy Ethernet switch is shown as a rectangle. The dotted lines represent 802.11 wireless links and the solid lines represent wired Ethernet connectivity.

Node A is the gateway node, connected to both the internet and the local network; it is meshed with nodes B and C. All the Ethernet links in the network comprised by nodes B, C and D are part of the same spanning tree domain. If an additional Ethernet link were added between nodes C and D, the STP process would disable one of the ports in order to prevent loops.

Node D is not in radio contact with nodes A, B or C, so it creates its own mesh network. It announces that it is a member of the Ethernet network comprised by B, C and D on this small mesh, and since it is the only member of this mesh, it becomes designated forwarder for traffic from this mesh to its Ethernet segment.

Meanwhile, on the mesh of which nodes A, B and C are members, node A announces that it has an Ethernet segment of its own, and since it is the only member of that mesh which can contact that Ethernet segment, it is elected designated forwarder for that mesh—Ethernet boundary. Nodes B and C both have connectivity to their Ethernet segment, and are both members of the same mesh, so they announce this fact. Whichever node has the best peer links to the mesh is elected designated forwarder. For the sake of this example, imagine that node B has better links and is therefore elected.

Upon receiving a STAMP notice of topology change, nodes announce the new information on the usual schedule. Each node starts announcing the new information as soon as it's found, and since the STAMP tables built by each member of the mesh are indexed by a unique identifier (e.g., a STAMP identifier, such as the bridge MAC address), the new information replaces the old within a few seconds. Stale information is handled by the simple expedient of expiring it after a few update periods. Nodes never announce information on behalf of other nodes, so there is no problem of stale data being propagated.

If client 2 sends a broadcast frame, node D receives it and forwards it to its mesh, the other client of its access point (3) and the Ethernet segment. Nodes B and C both receive it, as does client 1. Node C receives it and would send it to any of its clients, had it any, but as it is not designated forwarder for its mesh, it does not forward it; node B does, and node A receives the frame from the mesh. Node A forwards it to its own Ethernet segment, which does not have any clients in any case.

In this way, the switch between nodes B and C always receives traffic from the same source along the same vector, and therefore does not mislearn the source's location.

Things are only slightly more complex if a client of node C sends a broadcast frame. In this case, even though node C is not the designated forwarder, it injects the frame both into the Ethernet segment and the mesh; upon receiving this frame via the mesh, node B notes that the sender of this frame (node C) is a member of the same Ethernet segment, since the frame on the mesh has been marked that way already, and therefore it does not need to re-inject it into the Ethernet. Node D sees the frame only via the Ethernet, and it knows that node C is not a member of its mesh, and it is the designated forwarder for this mesh-Ethernet interface, so it forwards it as appropriate.

It can be seen that because this protocol only requires nodes to know about the Ethernet segment they are a member of, and the mesh segment they are a member of, it can be scaled without limit, and will not present a problem for very large networks. Because it guarantees that frames are delivered to wired Ethernet along the same vector every time, it does not require modifications to legacy Ethernet systems in order to work properly in connection with mesh networks. This is very different from protocols which guarantee determinism by forcing central configuration decisions to be made. In those systems, some central point must make decisions that affect the entire network, and there must be a scheme for communicating that information to every node in the network.

In keeping with the intrinsically decentralized, indefinitely scalable nature of mesh networks, STAMP achieves a similar level of performance without requiring any central authority or source of truth. As a consequence, disruptions caused by the failure of any particular node to correctly apply the protocol are limited in scope; even incorrectly injected frames will only affect a single Ethernet segment. As long as the nodes at the edges of a region are correctly applying STAMP markings, any looping or stochastic delivery will be localized to the region served by the noncompliant node. This makes the network resilient to failures of communication between STAMP nodes.

The STAMP protocol (and/or any suitable elements thereof) can be performed once, repeatedly (e.g., periodically, sporadically, in response to trigger occurrence, etc.), and/or with any other suitable timing. For example, STAMP announcements can be broadcast (e.g., periodically, such as every 15 seconds; in response to determination of STAMP metric and/or segment updates; etc.), and new forwarding devices can be determined based on the announcements (e.g., periodically, such as determined at the same periodic rate; in response to receipt of the STAMP announcements; etc.).

The STAMP protocol or modifications described herein may be applied to an entire LAN; a VLAN (e.g., independently applied to each VLAN of a network), a set of VLANs, and/or any other suitable broadcast domain(s); a larger network (e.g., WAN, MAN, network including multiple LANs, etc.); and/or any other suitable networked system.

A person of ordinary skill in the art will recognize that the STAMP protocol or modifications described herein may be applied to either of the system 100 or the method 200.

The methods of the preferred embodiment and variations thereof can be embodied and/or implemented at least in part as a machine configured to receive a computer-readable medium storing computer-readable instructions. The instructions are preferably executed by computer-executable components preferably integrated with a mesh network. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for network device communication, the method comprising:
in a network comprising a wireless mesh segment and an Ethernet segment, designating a first node as a forwarding device for communication between the wireless segment and the Ethernet segment, wherein:
the wireless mesh segment comprises a plurality of wireless devices connected by wireless links, the plurality of wireless devices comprising the first node and a second node; and
the Ethernet segment comprises a plurality of Ethernet devices connected by Ethernet, the plurality of Ethernet devices comprising the first node and the second node;
based on designating the first node as the forwarding device, determining a plurality of paths from a first device of the network to a second device of the network, each path of the plurality of paths comprising:
the first node; and
a respective set of wireless links connecting wireless devices of the path;
determining, for each path of the plurality of paths, a respective path cost of the path, comprising, for each wireless link of the path, determining a respective link cost based on a throughput metric and a wireless channel utilization metric, wherein the respective path cost is equal to a sum of the respective link cost of each wireless link of the path;
based on the path costs, selecting a selected path from the plurality of paths for communication from the first device to the second device, wherein the selected path has a lowest respective path cost of the plurality of paths; and
based on selecting the selected path, transmitting a communication from the first device to the second device via the selected path;
wherein, for each wireless link of each path of the plurality of paths, determining the respective link cost of the wireless link comprises calculating a respective metric M associated with a node of the wireless link, wherein M is defined by the following equation:

$$M = \frac{C}{D\left(1 - \frac{T_{busy} - T_{self}}{T_{active}}\right)}$$

wherein C is a constant; D is the throughput metric associated with the node; $T_{active}$ is an active time during which the node is active on a wireless channel associated with the wireless link; $T_{busy}$ is a total utilization time, within the active time, during which the wireless channel is in use; and $T_{self}$ is a self-utilization time, within the active time, during which the node is transmitting on the wireless channel.

2. The method of claim 1, wherein the throughput metric associated with the node is an exponentially weighted moving average of a physical layer transmission throughput of the node.

3. The method of claim 1, wherein:
the wireless mesh segment comprises the first device;
the Ethernet segment comprises the second device; and
each path of the plurality of paths further comprises:
a wireless link from a wireless device of the wireless mesh segment to the first node; and
an Ethernet link from the first node to an Ethernet device of the Ethernet segment.

4. The method of claim 1, wherein
the wireless mesh segment comprises the first device;
the Ethernet segment comprises the second device; and
each path of the plurality of paths further comprises:
a first wireless link from a wireless device of the wireless mesh segment to the second node;
a second wireless link from the second node to the first node; and an Ethernet link from the first node to an Ethernet device of the Ethernet segment.

5. The method of claim 1, wherein:
a path cost of an alternate path from the first device to the second device is lower than the path cost of the selected path;
the alternate path comprises the second node; and
the alternate path does not comprise the first node.

6. The method of claim 1, wherein:
the wireless mesh segment consists essentially of the plurality of wireless devices and the wireless links connecting the plurality of wireless devices; and
the Ethernet segment consists essentially of the plurality of the Ethernet devices and the Ethernet links connecting the plurality of Ethernet devices.

7. The method of claim 1, further comprising:
determining a second plurality of paths from the second device to the first device, each path of the second plurality of paths comprising a respective series of nodes of the plurality of nodes;
determining, for each path of the second plurality of paths, a respective evaluation of the path based on the throughput metric and the wireless channel utilization metric;
based on the evaluations, selecting a selected reverse path from the second plurality of paths for communication from the second device to the first device, wherein the selected path does not comprise a reverse path node of the selected reverse path; and
based on selecting the selected path, transmitting a second communication from the second device to the first device via the selected reverse path.

8. The method of claim 7, wherein, based on designating the first node as the forwarding device, the second plurality of paths is determined such that each path of the second plurality of paths comprises the first node.

9. A method for network device communication, the method comprising, in a mesh network comprising a first device, a second device, and a plurality of nodes:
determining a plurality of paths from the first device to the second device, each path of the plurality of paths comprising a respective series of nodes of the plurality of nodes;
determining, for each path of the plurality of paths, a respective evaluation of the path based on a throughput metric and a wireless channel utilization metric;
based on the evaluations, selecting a selected path from the plurality of paths for communication from the first device to the second device;
based on selecting the selected path, transmitting a communication from the first device to the second device via the selected path;
determining a second plurality of paths from the second device to the first device, each path of the second plurality of paths comprising a respective series of nodes of the plurality of nodes;
determining, for each path of the second plurality of paths, a respective evaluation of the path based on the throughput metric and the wireless channel utilization metric;
based on the evaluations, selecting a selected reverse path from the second plurality of paths for communication from the second device to the first device, wherein the selected path does not comprise a reverse path node of the selected reverse path; and
based on selecting the selected path, transmitting a second communication from the second device to the first device via the selected reverse path.

10. The method of claim 9, wherein:
each path of the plurality of paths further comprises a respective set of wireless links connecting nodes of the respective plurality series of nodes;
for each path of the plurality of paths, determining the respective evaluation of the path comprises:
for each wireless link of the path, determining a respective link cost based on the throughput metric and the wireless channel utilization metric; and
determining a respective path cost equal to a sum of the respective link cost of each wireless link of the path; and
the selected path has a lowest respective path cost of the plurality of paths.

11. The method of claim 10, wherein, for each wireless link of each path of the plurality of paths, determining the respective link cost of the wireless link comprises calculating a respective metric M associated with a node of the wireless link, wherein M is defined by the following equation:

$$M = \frac{C}{D\left(1 - \frac{T_{busy} - T_{self}}{T_{active}}\right)}$$

wherein C is a constant; D is the throughput metric associated with the node; $T_{active}$ is an active time during which the node is active on a wireless channel associated with the wireless link; $T_{busy}$ is a total utilization time, within the active time, during which the wireless channel is in use; and $T_{self}$ is a self-utilization time, within the active time, during which the node is transmitting on the wireless channel.

12. The method of claim 11, wherein the throughput metric associated with the node is an exponentially weighted moving average of a physical layer transmission throughput of the node.

13. The method of claim 11, wherein determining the respective link cost of the wireless link further comprises modifying the metric based on a thermal throttling factor associated with the node.

14. The method of claim 10, wherein each path of the plurality of paths consists essentially of the first device, the second device, the respective series of nodes, and the respective set of wireless links.

15. The method of claim 10, wherein a first wireless link of the selected path comprises a first wireless connection at a first radio frequency and a second wireless connection at a second radio frequency different from the first radio frequency.

16. The method of claim 10, wherein the selected path further comprises an Ethernet link.

17. The method of claim 10, wherein, for each path of the plurality of paths:
each wireless link of the path comprises a respective origin node and a respective destination node;
for each wireless link of the path, the respective link cost is determined at the respective origin node; and
determining a respective path cost comprises, at each respective origin node:
receiving a cumulative cost from the respective destination node; and modifying the cumulative cost by adding the respective link cost to the cumulative cost.

18. The method of claim 9, wherein the throughput metric is an exponentially weighted moving average of a physical layer transmission throughput.

19. The method of claim 9, wherein the wireless channel utilization metric is determined based on utilization of a wireless channel and thermal throttling of a radio associated with the wireless channel.

\* \* \* \* \*